(12) United States Patent
Louis

(10) Patent No.: US 9,776,030 B1
(45) Date of Patent: *Oct. 3, 2017

(54) REBOUND AND BALANCE TRAINING DEVICE

(71) Applicant: John G Louis, Northfield, IL (US)

(72) Inventor: John G Louis, Northfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/495,907

(22) Filed: Apr. 24, 2017

Related U.S. Application Data

(63) Continuation-in-part of application No. 14/816,055, filed on Aug. 2, 2015, now Pat. No. 9,630,040, which is a continuation-in-part of application No. 13/602,087, filed on Aug. 31, 2012, and a continuation-in-part of application No. 29/462,670, filed on Aug. 6, 2013, now Pat. No. Des. 735,819.

(60) Provisional application No. 61/530,942, filed on Sep. 3, 2011.

(51) Int. Cl.
 *A63B 5/11* (2006.01)
 *A63B 21/00* (2006.01)
 *A63B 21/02* (2006.01)
 *A63B 21/04* (2006.01)
 *A63B 26/00* (2006.01)

(52) U.S. Cl.
 CPC .......... *A63B 5/11* (2013.01); *A63B 21/00065* (2013.01); *A63B 21/023* (2013.01); *A63B 21/0407* (2013.01); *A63B 21/4034* (2015.10); *A63B 21/4035* (2015.10); *A63B 26/003* (2013.01)

(58) Field of Classification Search
 CPC .... A63B 5/00; A63B 5/06; A63B 5/11; A63B 5/12; A63B 5/16
 See application file for complete search history.

(56) References Cited

U.S. PATENT DOCUMENTS

| | | |
|---|---|---|
| 3,047,294 A | 7/1962 | Maxwell |
| 4,474,369 A | 10/1984 | Gordon |
| 4,787,630 A | 11/1988 | Watson et al. |
| 4,836,530 A | 6/1989 | Stanley, Jr. |
| 5,499,949 A | 3/1996 | Heubl |
| 5,674,157 A | 10/1997 | Wilkinson |
| 5,690,383 A | 11/1997 | Meeker |
| 5,876,311 A | 3/1999 | Coates et al. |
| 6,135,922 A | 10/2000 | Nissen |
| 6,599,198 B2 | 7/2003 | Ettenhofer |
| 6,942,487 B2 | 9/2005 | Corbalis |
| 7,094,181 B2 | 8/2006 | Hall |
| 7,666,126 B2 | 2/2010 | Rempe |

(Continued)

*Primary Examiner* — Stephen R Crow
*Assistant Examiner* — Rae Fischer
(74) *Attorney, Agent, or Firm* — John C. Shepard

(57) ABSTRACT

A rebound and balance training device includes a frame, a footboard, and a plurality of resilient spring elements extending between and attached to the frame and the footboard to support the footboard above a supporting surface. A user standing on the footboard manually effects repeated vertical bouncing movement between upper and lower positions. The distance traveled by the footboard, the effort required to effect movement, and the stability thereof may be modified by selectively modifying the number, the length, the position, or the elasticity of the resilient elements. In one embodiment, a pair of footboards is employed to simulate skiing movements.

8 Claims, 20 Drawing Sheets

(56) References Cited

U.S. PATENT DOCUMENTS

| | | |
|---|---|---|
| 2005/0043142 A1 | 2/2005 | Rieber |
| 2006/0079378 A1* | 4/2006 | Ader .................. A63B 5/16 482/26 |
| 2008/0076638 A1 | 3/2008 | Publicover |

* cited by examiner

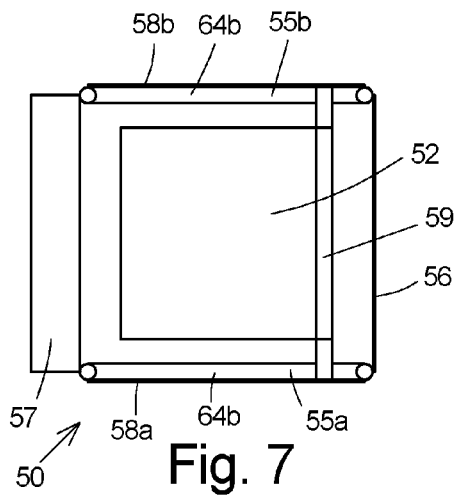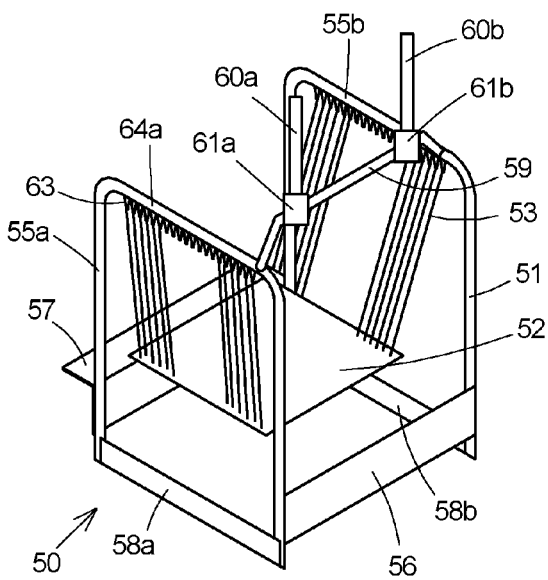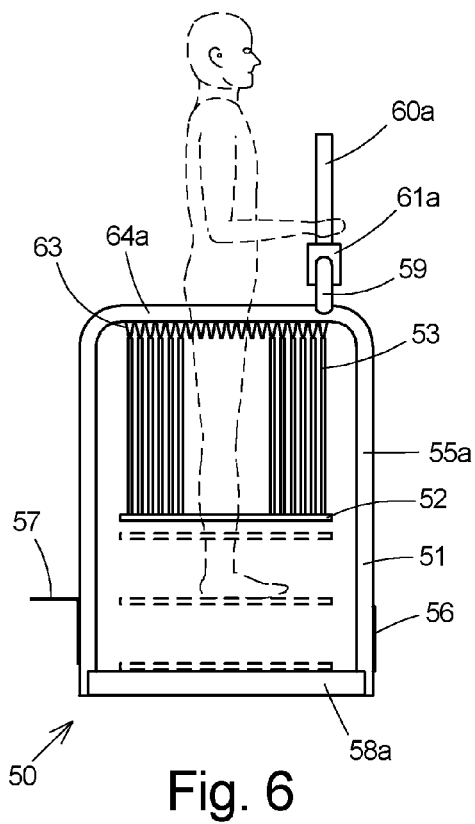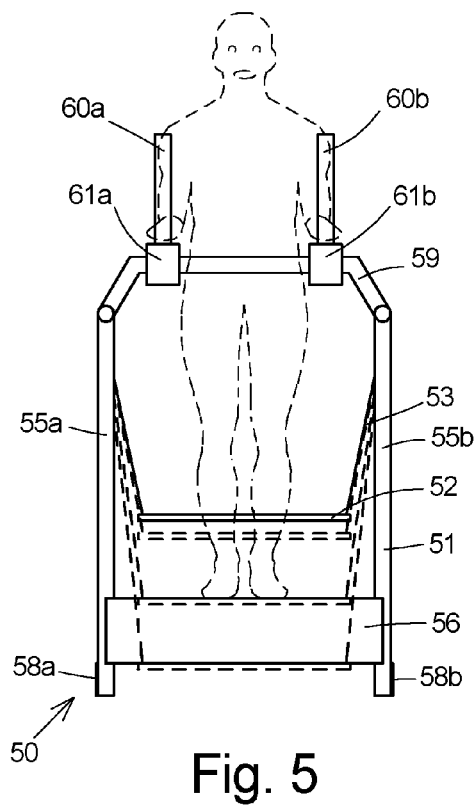

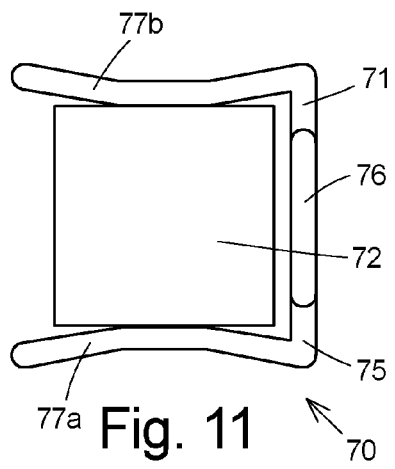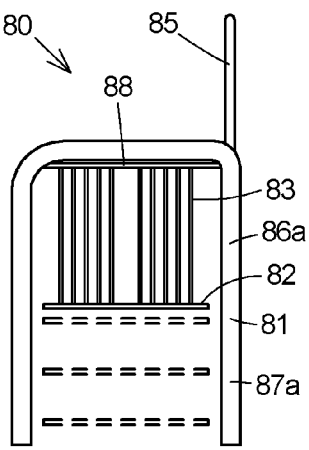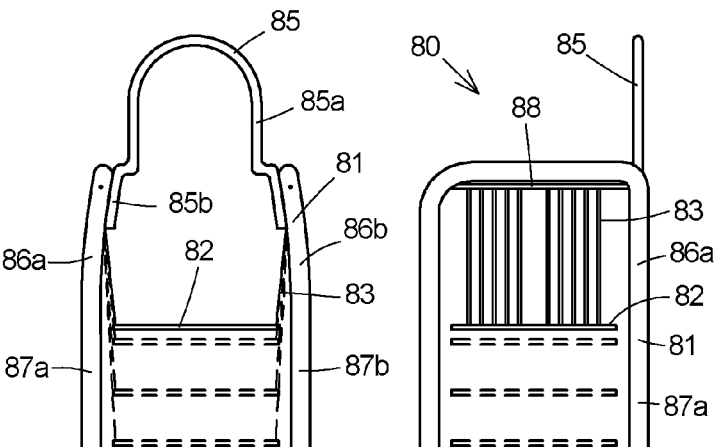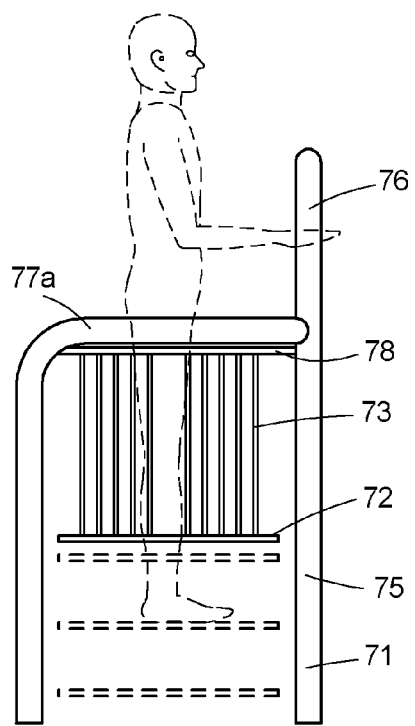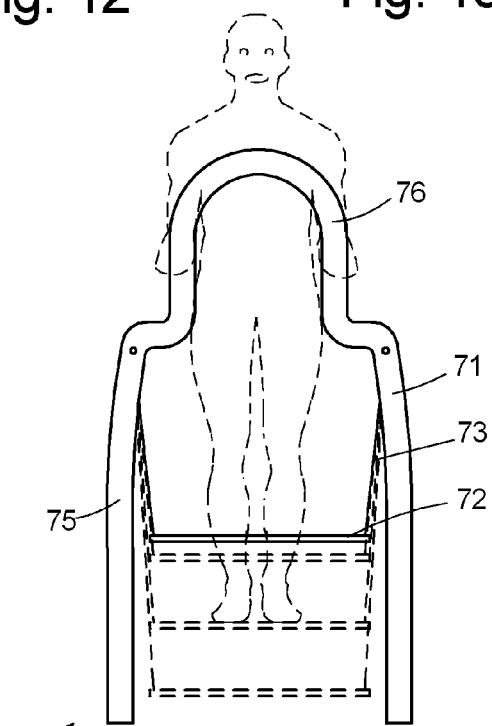

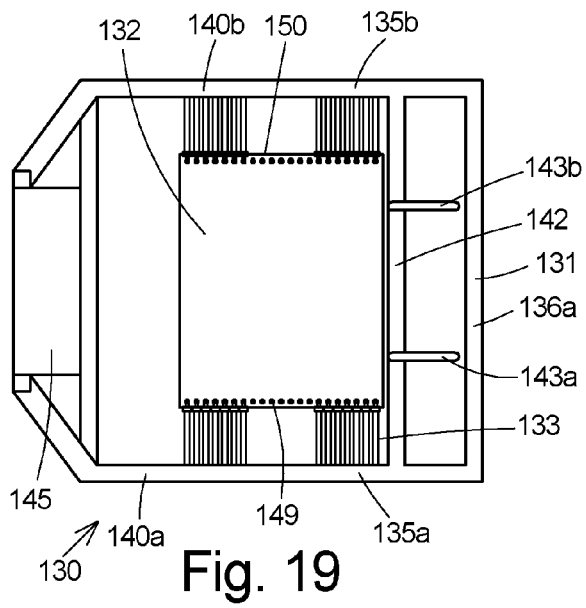
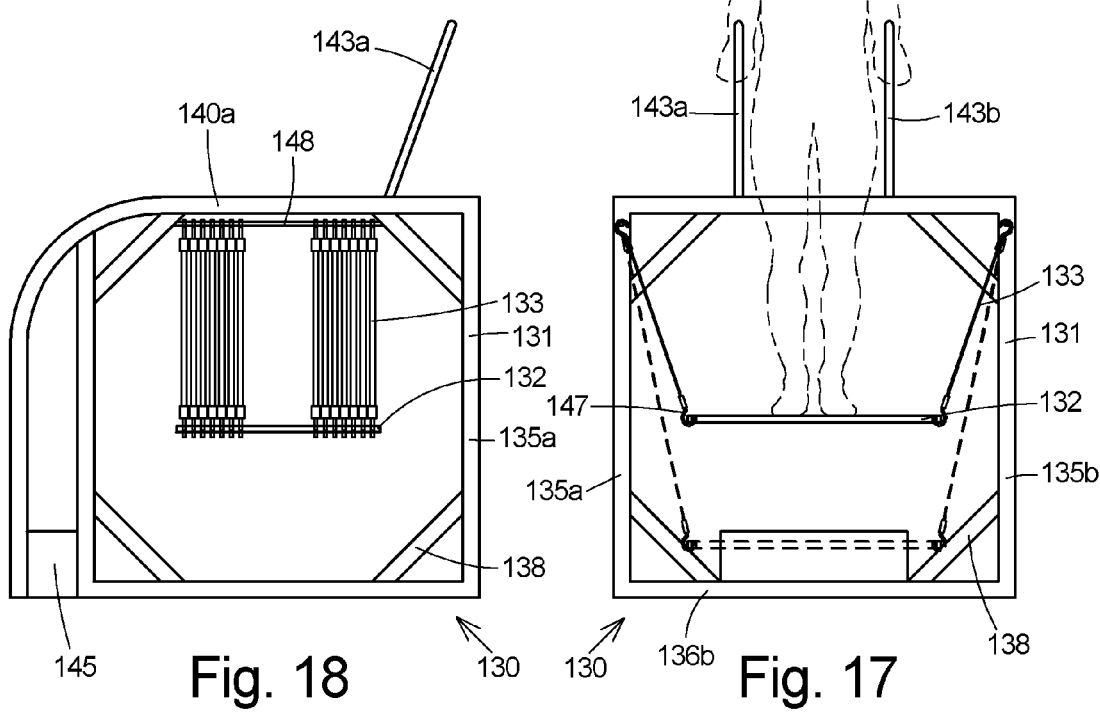

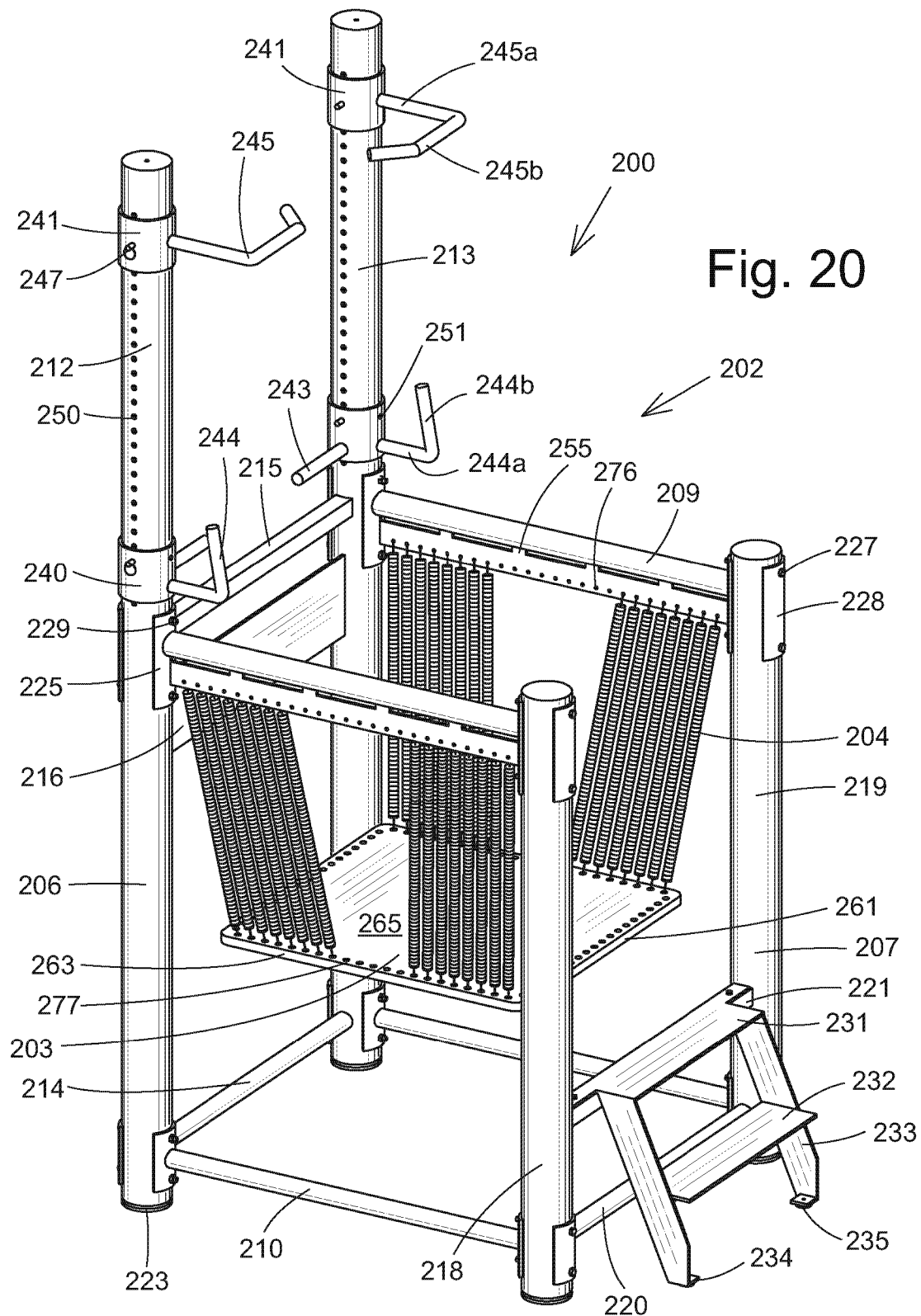

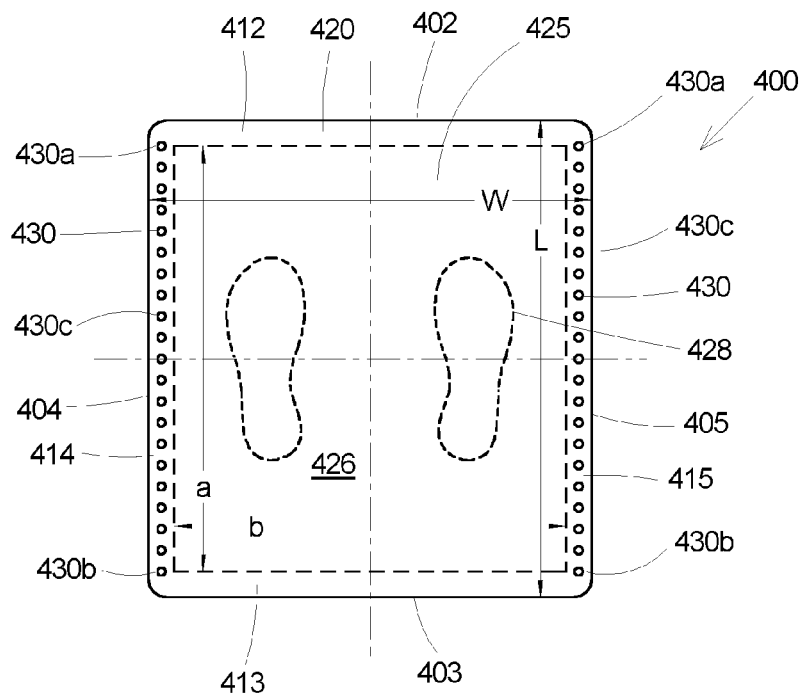

| TABLE 1 -- SPRING CONSTANT (k) = 0.555 and INITIAL TENSION (IT) = 3.38 | | | | | |
|---|---|---|---|---|---|
| WEIGHT LOAD ON SPRINGS (pounds) | ADDITIONAL FORCE APPLIED BY USER (pounds) | NUMBER OF SPRINGS | APPROXIMATE DEFLECTION CAUSED BY WEIGHT (inches) | APPROXIMATE DEFLECTION CAUSED BY FORCE (inches) | APPROXIMATE TOTAL DEFLECTION (inches) |
| 75 | 37.5 | 8 | 10.8 | 8.4 | 19.2 |
| 100 | 50.0 | 10 | 11.9 | 9.0 | 20.9 |
| 125 | 62.5 | 14 | 10.0 | 8.0 | 18.0 |
| 150 | 75.0 | 16 | 10.8 | 8.4 | 19.2 |
| 175 | 87.5 | 18 | 11.4 | 8.8 | 20.2 |
| 200 | 100.0 | 22 | 10.3 | 8.2 | 18.5 |
| 225 | 112.5 | 24 | 10.8 | 8.4 | 19.2 |
| 250 | 125.0 | 26 | 11.2 | 8.7 | 19.9 |

| TABLE 2 -- SPRING CONSTANT (k) = 0.555 and INITIAL TENSION (IT) = 3.38 | | | | | |
|---|---|---|---|---|---|
| WEIGHT LOAD ON SPRINGS (pounds) | ADDITIONAL FORCE APPLIED BY USER (pounds) | NUMBER OF SPRINGS | APPROXIMATE DEFLECTION CAUSED BY WEIGHT (inches) | APPROXIMATE DEFLECTION CAUSED BY FORCE (inches) | APPROXIMATE TOTAL DEFLECTION (inches) |
| 75 | 37.5 | 12 | 5.2 | 5.6 | 10.8 |
| 100 | 50.0 | 16 | 5.2 | 5.6 | 10.8 |
| 125 | 62.5 | 20 | 5.2 | 5.6 | 10.8 |
| 150 | 75.0 | 24 | 5.2 | 5.6 | 10.8 |
| 175 | 87.5 | 28 | 5.2 | 5.6 | 10.8 |
| 200 | 100.0 | 32 | 5.2 | 5.6 | 10.8 |
| 225 | 112.5 | 36 | 5.2 | 5.6 | 10.8 |
| 250 | 125.0 | 40 | 5.2 | 5.6 | 10.8 |

| TABLE 3 -- SPRING CONSTANT (k) = 0.555 and INITIAL TENSION (IT) = 3.38 | | | | | |
|---|---|---|---|---|---|
| WEIGHT LOAD ON SPRINGS (pounds) | ADDITIONAL FORCE APPLIED BY USER (pounds) | NUMBER OF SPRINGS | APPROXIMATE DEFLECTION CAUSED BY WEIGHT (inches) | APPROXIMATE DEFLECTION CAUSED BY FORCE (inches) | APPROXIMATE TOTAL DEFLECTION (inches) |
| 75 | 75.0 | 12 | 5.2 | 11.3 | 16.4 |
| 100 | 100.0 | 16 | 5.2 | 11.3 | 16.4 |
| 125 | 125.0 | 20 | 5.2 | 11.3 | 16.4 |
| 150 | 150.0 | 24 | 5.2 | 11.3 | 16.4 |
| 175 | 175.0 | 28 | 5.2 | 11.3 | 16.4 |
| 200 | 200.0 | 32 | 5.2 | 11.3 | 16.4 |
| 225 | 225.0 | 36 | 5.2 | 11.3 | 16.4 |
| 250 | 250.0 | 40 | 5.2 | 11.3 | 16.4 |

FIG. 35

REBOUND AND BALANCE TRAINING DEVICE

CROSS-REFERENCE TO RELATED APPLICATIONS

This application is a continuation-in-part and claims priority from U.S. Nonprovisional application Ser. No. 14/816,055, filed Aug. 2, 2015, now U.S. Pat. No. 9,630,040, issued Aug. 25, 2017; Nonprovisional application Ser. No. 14/816,055 is a continuation-in-part and claims priority from U.S. Nonprovisional application Ser. No. 13/602,087, filed Aug. 31, 2012, and U.S. Design application Serial No. 29/462,670, filed Aug. 6, 2013, now U.S. patent No. Des. 735819, issued Aug. 4, 2015; and, Nonprovisional application Ser. No. 13/602,087 claims the benefit of U.S. Provisional Application Ser. No. 61/530,942 filed Sep. 3, 2011.

BACKGROUND OF THE INVENTION

Technical Field

The present invention pertains to exercise apparatus and, more particularly, to a standing rebound and balance training device with a footboard resiliently suspended from a supporting frame.

Background Art

It is generally accepted that exercise is beneficial in maintaining a healthy body. Two general types of exercise are anaerobic and aerobic and both should be included in a balanced exercise program. Anaerobic exercise involves low-level muscle exertion over short periods of time and includes, for example, strength training and short-distance running. Aerobic (or cardiovascular) exercise involves higher levels of muscle exertion over a longer period of time to work the heart, lungs and blood vessels and includes, for example, long-distance running, jogging, walking, aerobic dancing, jumping rope, swimming, bicycling, basketball and tennis.

Exercise devices for assisting users in aerobic exercise include treadmills, stair climbers, stationary bicycles, elliptical trainers, rowers, trampolines, and the like. Aerobic exercise may also classified as low impact or high impact. Some of the aforementions exercise devices provide low impact exercise and some high impact exercise. Intensive high impact aerobic exercise may increase endurance, muscle strength, bone growth, and cardiovascular health. However, high impact exercise may not be appropriate for individuals who are older or disabled and must adopt less strenous or low-impact forms of aerobic exercise.

Rebounding has been developed to provide therapeutic movement, exercise and recreation for individuals with special needs. Typically, a small trampoline or mini-trampoline is used as a rebounding training device. Bouncing or jumping on a trampoline provides aerobic exercise. Besides the usual benefits associated with aerobic exercise, such as muscle development and calorie burning, it is also believed that rebounding is beneficial for the lymph system in the human body.

It is noted that the use of a trampoline often means that there are no handholds for balance and that the user's feet often leave the flexible spring surface. When the user lands, there is a jarring effect on the feet, angles, shins, knees, and lower back. Also, there is the possibility that the user may land awdwardly on the trampoline's flexible surface, so that he might twist those same parts and cause injury.

While all of the prior art devices are sufficient for their intended function, other constructions for exercise devices may provide features that are more desirable to a user.

BRIEF SUMMARY OF THE INVENTION

The present invention is directed to overcoming one or more of the problems as set forth above.

It is an object of the present invention to provide a rebound training device maximizing a user's level of aerobic exercise and minimizing the effects of impact on the user.

It is another object of the present invention to provide a rebound training device wherein the amount of vertical travel may be modified to increase or decrease the intensity of physical exertion during a workout.

It is a further object of the present invention to provide a rebound training device wherein the user is able to maintain his balance when rocking or swaying may be adjusted.

In accordance with the present invention, a rebound training device includes a frame with a lower portion adapted to rest on a floor and an upper portion disposed thereabove, a footboard adapted to support a user standing thereon, and a plurality of resilient spring elements extending between the frame and the footboard to suspend the footboard below the frame upper portion above the floor.

In one aspect of the invention, the resilient spring elements are detachably secured to the frame and the footboard so that the number and elastic capacity of the resilient spring elements may be modified.

In another aspect of the invention, the resilient spring elements have a spring constant having a range between 0.25 and 2.5 so that spring action is effective for a broad range of users with differing abilities.

In another aspect of the invention, the footboard includes connecting means adjacent the lateral edges thereof to couple with connecting means on respective ends of the resilient spring elements to join the footboard to the resilient spring elements.

In a further aspect of the invention, the footboard includes an array of holes adjacent the lateral edges thereof adapted to receive connectors on the respective ends of the resilient spring elements.

In yet another aspect of the invention, the frame includes gripping portions adapted to grasped by a user to assist in applying bounce force and allow the user to balance himself on the moving footboard.

In another aspect of the invention, a frame is provided that is relatively compact minimizing its footprint with its height and width enabling the resilient spring elements to be directed downward and inward to the footboard and enabling vertical movement to a range allowing the user to maintain his grip on the frame gripping portion during vertical travel.

In another aspect of the invention, hand grips are provided that can be adjusted relative to vertical for the desired comfort of the user depending on the user's height, bounce height range, and other positions and movement achieved by the user.

In another aspect of the invention, the hand grips are configured as ski-pole-type handlebars.

In another aspect of the invention, the footboard is relatively large for increased stability.

In another aspect of the invention, a rectangular footboard may be rotated to change its X-axis orientation and thereby modify forward/rearward and side-to-side stability.

In an alternative embodiment, a pair of footboards is employed to enable to a user to simulate skiing movements in addition to effecting rebounding motions.

In another aspect of the invention, the frame is constructed with rigid tubular members that can be manufactured in a disassembled state and reassembled for use.

It is an object of the invention to provide an exercise device allowing a user to do a variety of low impact rebound, balance and strength exercises including rebounding, pull-ups, chin-ups, squats, crunches, dips, lateral core glides, swaying (simulating alpine skiing), and the like.

BRIEF DESCRIPTION OF THE SEVERAL VIEWS OF THE DRAWINGS

The details of construction and operation of the invention are more fully described with reference to the accompanying drawings which form a part hereof and in which like reference numerals refer to like parts throughout.

In the drawings:

FIG. 5 is a front elevational view of a second rebound training device embodying the principles of the invention;

FIG. 6 is a side elevational view of the rebound training device shown in FIG. 5;

FIG. 7 is a top plan view of the rebound training device shown in FIG. 5;

FIG. 8 is an isometric view of the rebound training device shown in FIG. 5;

FIG. 9 is a front elevational view of a third rebound training device embodying the principles of the invention;

FIG. 10 is a side elevational view of the rebound training device shown in FIG. 9;

FIG. 11 is a top plan view of the rebound training device shown in FIG. 9;

FIG. 12 is a front elevational view of a fourth rebound training device embodying the principles of the invention;

FIG. 13 is a side elevational view of the rebound training device shown in FIG. 12;

FIG. 17 is a front elevational view of a sixth rebound training device embodying the principles of the invention;

FIG. 18 is a side elevational view of the rebound training device shown in FIG. 17;

FIG. 19 is a top plan view of the rebound training device shown in FIG. 17;

FIG. 20 is a rear, side isometric view of a seventh rebound training device embodying the principles of the invention;

FIG. 33 is a top plan view of an embodiment of a footboard showing the upper surface and the placement of the user's feet thereon in phantom;

FIG. 34 is an isometric view of an alternative embodiment of a footboard; and, FIG. 35 shows three tables illustrating approximate spring deflections under various loads.

Figure 3:
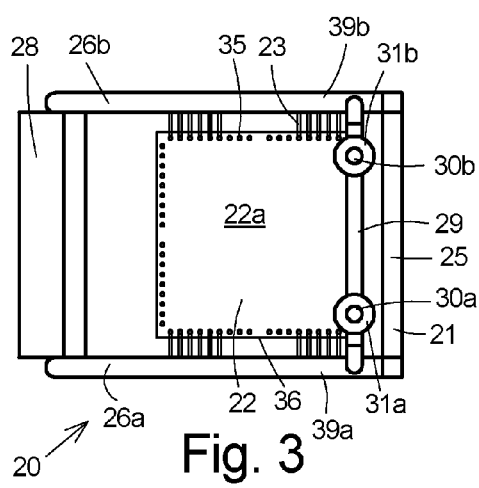
FIG. 3 is a top plan view of the rebound training device shown in FIG. 1.
Figure 4:
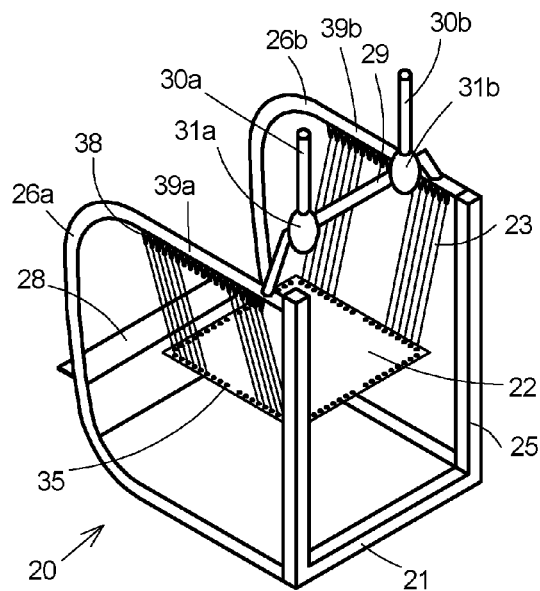
FIG. 4 is an isometric view of the rebound training device shown in FIG. 1.
Figure 2:
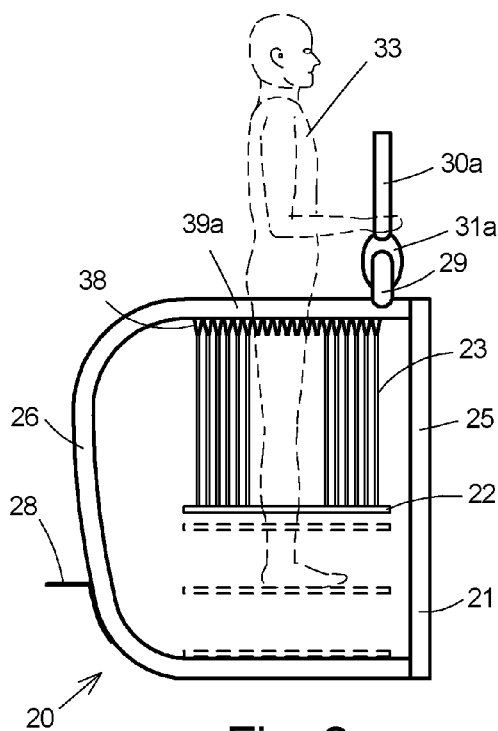
FIG. 2 is a side elevational view of the rebound training device shown in FIG. 1.
Figure 1:
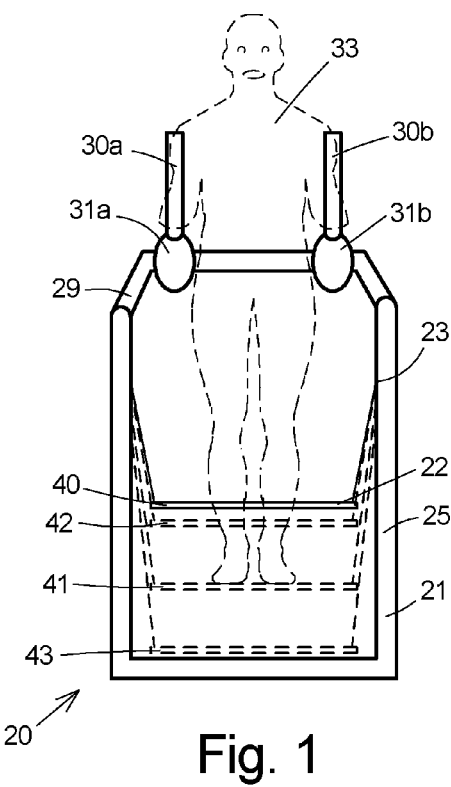
FIG. 1 is a front elevational view of a rebound training device embodying the principles of the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood.

DETAILED DESCRIPTION OF THE PREFERRED EMBODIMENTS

While the present invention is susceptible of embodiment in many different forms, there are shown in the drawings and will be described herein in detail specific embodiments thereof with the understanding that the present disclosure is to be considered as an exemplification of the principles of the invention and is not intended to limit the invention to the specific embodiments illustrated.

Referring to the drawings in greater detail, and more particularly to FIGS. 1-4, a rebound training device, generally designated 20, is seen to include a stationary open frame structure, generally designated 21, a movable platform or footboard 22, and a plurality of resilient elements, collectively designated 23, suspending the footboard 22 from the frame structure 21 and positioning the footboard 22 above a supporting surface (not shown).

For the purposes of description and to aid in the understanding of the invention disclosed herein, a longitudinal X-axis extends from front to back, a lateral Y-axis extends from side to side, and a vertical Z-axis extends from top to bottom. Longitudinal translational motion is referred to as surge and rotation about an axis parallel to the X-axis is referred to as roll. Lateral translational motion is referred to as sway and rotation about an axis parallel to the Y-axis is referred to as pitch or rock. Vertical translational motion is referred to as heave or bounce and rotation about an axis parallel to the Z-axis is referred to as yaw or twist. As will be readily understood that while a user will primarily use the training device to effect up and down bouncing of himself on the footboard, the user by exerting appropriate force to the footboard may cause the footboard to move or rotate in any of the aforementioned directions. It should also be understood that parts on one lateral side of the training device have similar corresponding parts on the opposite side of the training device.

The open frame structure 21 includes a U-shaped, tubular front frame 25, a pair of C-shaped, tubular, side frames 26a and 26b, an L-shaped rear step-brace 28, and an angular, tubular cross member 29. Attached to the cross member 29, which rises above the side frames 26a and 26b, are a pair of upright handlebars 30a and 30b secured to the round cross member 29 by clamps 31a and 31b allowing horizontal adjustment of the spacing between the handlebars 30a and 30b and their angle relative to the frame 25. The upper and lower forward edges of the side frames 26a and 26b, which are formed of round tube, are fixed to the rear surface of the front frame 25. The step-brace 28 formed of a bent plate and the angular cross member 29 formed of round tube extend between the side frames 26a and 26b and provide structural support. The frame structure 21 is constructed of 2.5-inch square tube and 2.5-inch round tube using steel, aluminum, carbon fiber, wood, or other suitable materials. It is contemplated that the frame may be constructed so as to be disassembled and reassembled as necessary. The frame structure 21, excluding the cross member, handlebars and step, is approximately 36 inches wide, 45 inches long and 48 inches high.

The footboard 22 has an upper surface 22a upon which a user 33 (shown in phantom) places his feet measures approximately 26 inches by 24 inches and has an array of spaced holes, collectively designated 35, extending along and adjacent its peripheral edges 36, but may be constructed in other sizes depending on the stability desired or a user's stance. The footboard 22 is of a material sufficiently rigid to support a user standing thereon, such as plastic, wood, metal or the like.

The resilient elements 23 have a first end attached to the frame structure 21, a second end attached to the footboard 22, and a length. The resilient elements 23 extend from the frame structure 21 downwardly and inwardly to the peripheral edges of the footboard 22. The resilient elements 23 may be rubber straps, elastic bands, bungees, springs, or the like, that enable the footboard 22 to be reciprocally moved up and down vertically relative to the frame 21. The number of resilient elements 23 employed and their elasticity is selected to provide an appropriate range of vertical movement. Unloaded, the footboard 22 rests at an upper position indicated at 40. When a user 33 steps onto the footboard 22, the footboard 22 is caused to move to a middle position shown in phantom at 41. As the user 33 bounces in trampoline fashion, the footboard 22 will move between an upper position shown in phantom at 42 and a lower position shown in phantom at 43, which are approximately 8 inches above and below the middle position 41. Movement of the user 33 may also effect greater vertical motion as well as controlled horizontal translation and rotational motion of the footboard 22.

It is understood that the resilient elements 23 are selected to locate the footboard in a vertical position wherein downward travel is limited to a height slightly above the supporting floor surface and upward travel is limited to a height that enables the user to maintain a grip on the handlebars or other gripping areas.

Placement of the resilient elements 23 is adjustable along zigzag wire hangers 38 secured to the underside of the top elements 39a and 39b of respective C-frames 26a and 26b and the spaced holes 35 along the footboard periphery. It is understood that the horizontal placement of the resilient elements 23 along the wire hangers and the footboard regulate the stability of the footboard, particularly its pitch or sway. It is also understood that it is possible to construct the device using many types of releasable connectors, including hooks, rings, eyelets, bolts, screws, or the like.

In FIGS. 4-8, a second embodiment of a rebound training device, generally designated 50, is seen to include a frame structure, generally designated 51, a footboard 52, and a plurality of resilient elements, collectively designated 53, suspending the footboard 52 from the frame structure 51. Herein, the frame structure 51 includes a pair of spaced, inverted, U-shaped, tubular side frames 55a and 55b, a front brace plate 56, an L-shaped rear step-brace 57 extending between the side frames 55a and 55b, a pair of lower side brace plates 58a and 58b, and a tubular cross member 59. Attached to the angular cross member 59, which rises above the side frames 55a and 55b, are a pair of upright handlebars 60a and 60b secured to the round cross member 59 by clamps 61a and 61b allowing horizontal adjustment of the spacing between the handlebars 60a and 60b and the vertical angle thereof. Herein, the frame components are formed from 2-inch round tube and brace elements from flat plate. The frame structure 51, excluding the cross member, handlebars and step, is approximately 36 inches wide, 36 inches long and 48 inches high.

Similar to the rebound training device shown in FIGS. 1-4, the resilient elements 53 extend between the spaced angled openings of zigzag wire hangers 63 fixed to the underside of the top elements 64 of the frame 51 and arrayed holes (not shown) adjacent the peripheral edges of the footboard 52.

In FIGS. 9-11, a third embodiment of a rebound training device, generally designated 70, is seen to include a frame structure, generally designated 71, a footboard 72, and a plurality of resilient elements, collectively designated 73, suspending the footboard 72 from the frame structure 71. Herein, the frame structure 71 includes an inverted, generally U-shaped, tubular front frame 75 with an upper, grippable, narrow portion 76, and a pair of spaced, inverted, L-shaped, tubular side frames 77a and 77b having their forward ends fixed to the rear surface of the front frame 75. The side frames 77a and 77b converge inwardly along their upper portions to provide gripping areas in the center thereof for the user. Herein, the frame components are formed from 2.5-inch round tube. The frame structure 71, excluding the cross member, handlebars and step, is approximately 36 inches wide, 36 inches long and 68 inches high.

Similar to the footboard shown in FIG. 3, the footboard 72 has an array of peripheral holes (not shown) enabling the lower ends of the respective resilient elements 73 to be attached to the footboard 72. The upper ends of the respective resilient elements 73 are attached to horizontal hanger bars 78 mounted to the frame 71 below the top portions of the side frames 77a and 77b.

In FIGS. 12 and 13, a fourth embodiment of a rebound training device, generally designated 80, is seen to include a frame structure, generally designated 81, a footboard 82, and a plurality of resilient elements, collectively designated 83, suspending the footboard 82 from the frame structure 81. Herein, the frame structure 81 includes an inverted U-shaped, tubular front frame 85, which provides upright gripping sections 85a and lower spaced attaching sections 85b, and a pair of spaced, inverted, U-shaped, tubular side frames 86a and 86b. The front frame 85 extends between the side frames 86*a* and 86*b* and is secured on the downwardly extending forward portions 87*a* and 87*b* of the side frames 86*a* and 86*b*. The resilient elements 83 extend between horizontal hanger bar 88 and the footboard 82. Herein, the side frames 86*a* and 86*b* are formed from 3-inch round tube and the front frame 85 is formed from 1.5-inch round tube. The frame structure 81, excluding the cross member, handlebars and step, is approximately 36 inches wide, 36 inches long and 68 inches high.

Figure 16:
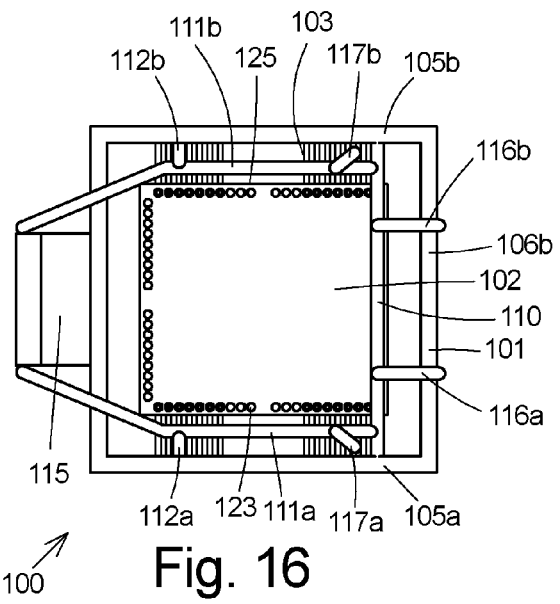
FIG. 16 is a top plan view of the rebound training device shown in FIG. 14.
Figure 15:
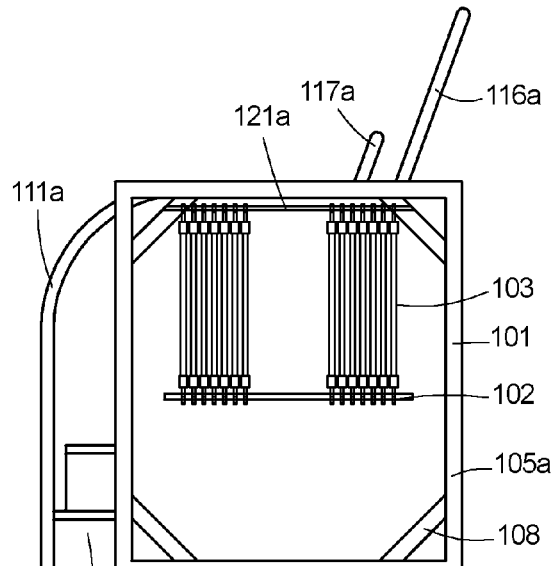
FIG. 15 is a side elevational view of the rebound training device shown in FIG. 14.
Figure 14:
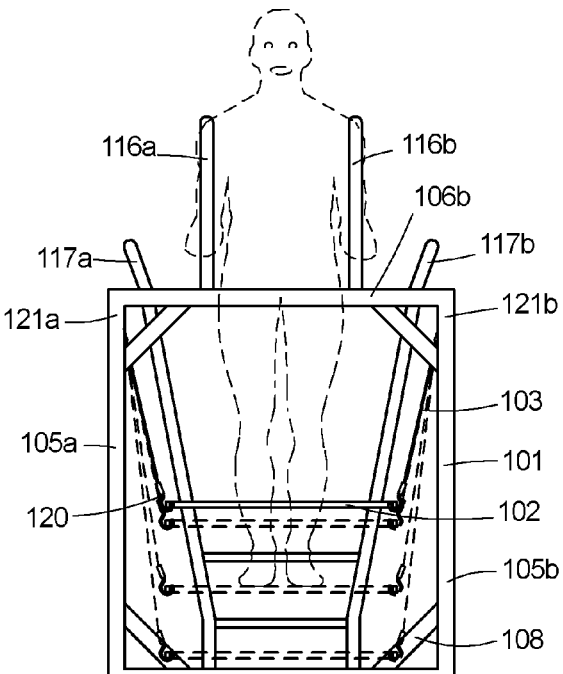
FIG. 14 is a front elevational view of a fifth rebound training device embodying the principles of the invention.
Figure 21:
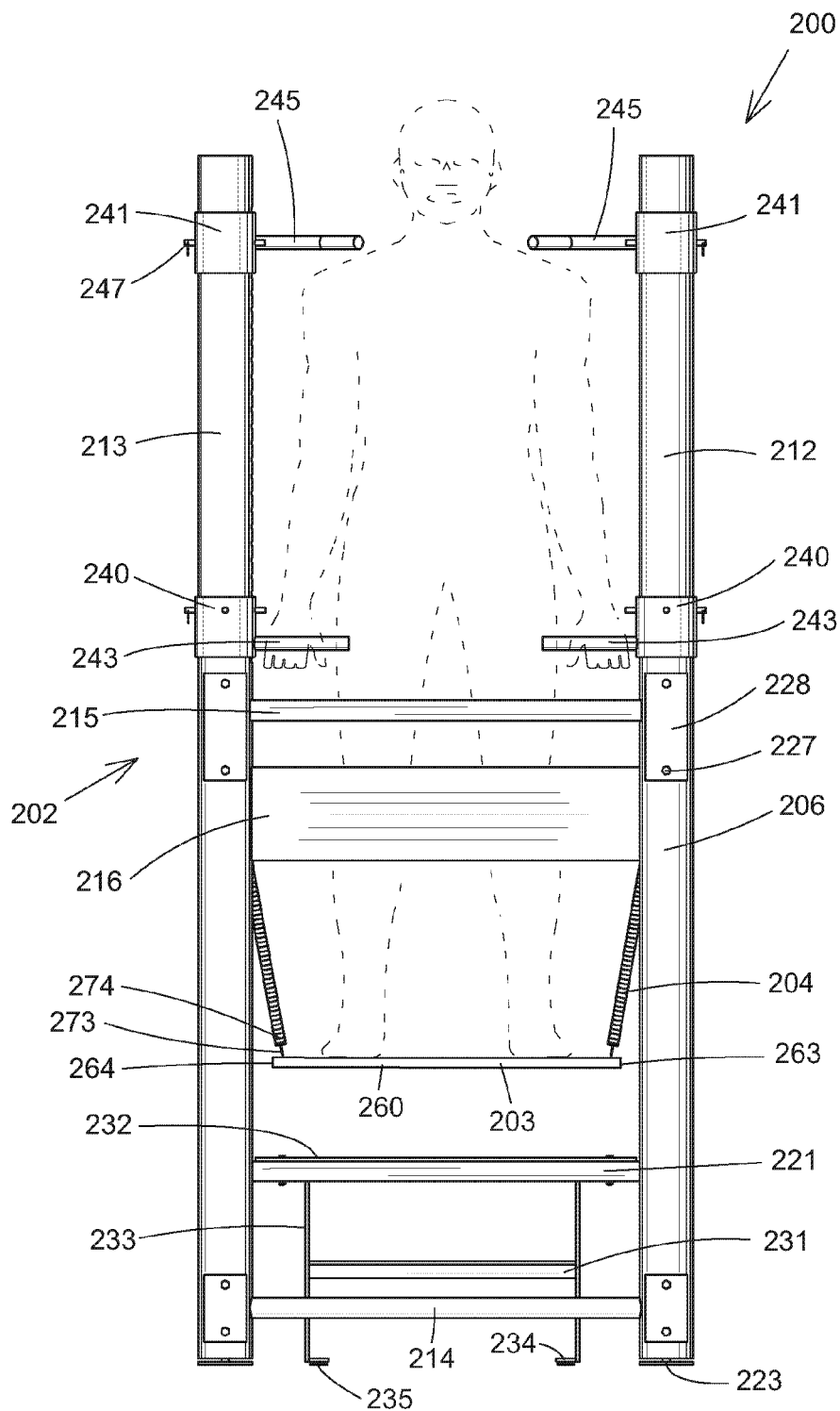
FIG. 21 is a front elevational view of the rebound training device shown in FIG. 20.
Figure 22:
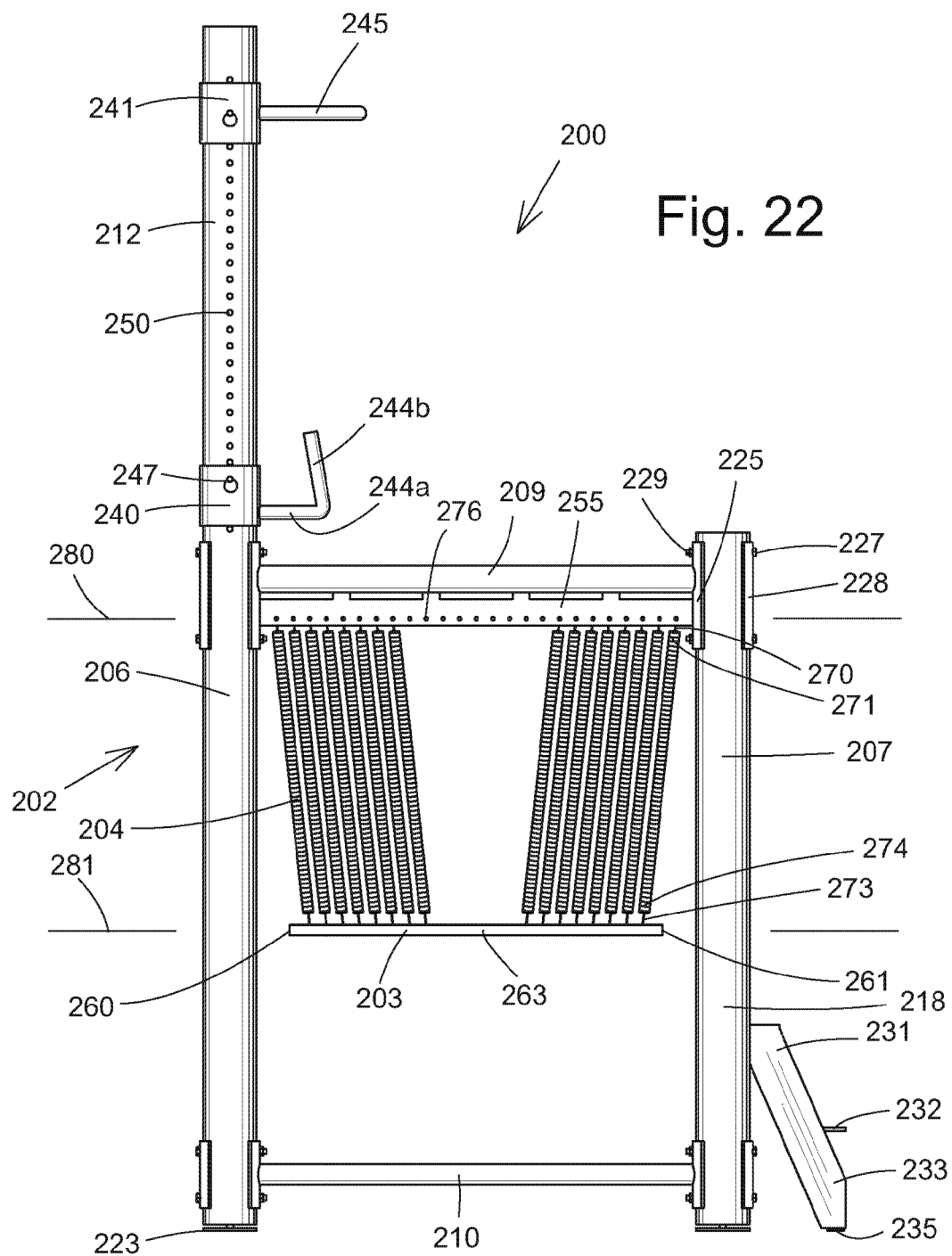
FIG. 22 is a right side elevational view of the rebound training device shown in FIG. 20.
Figure 23:
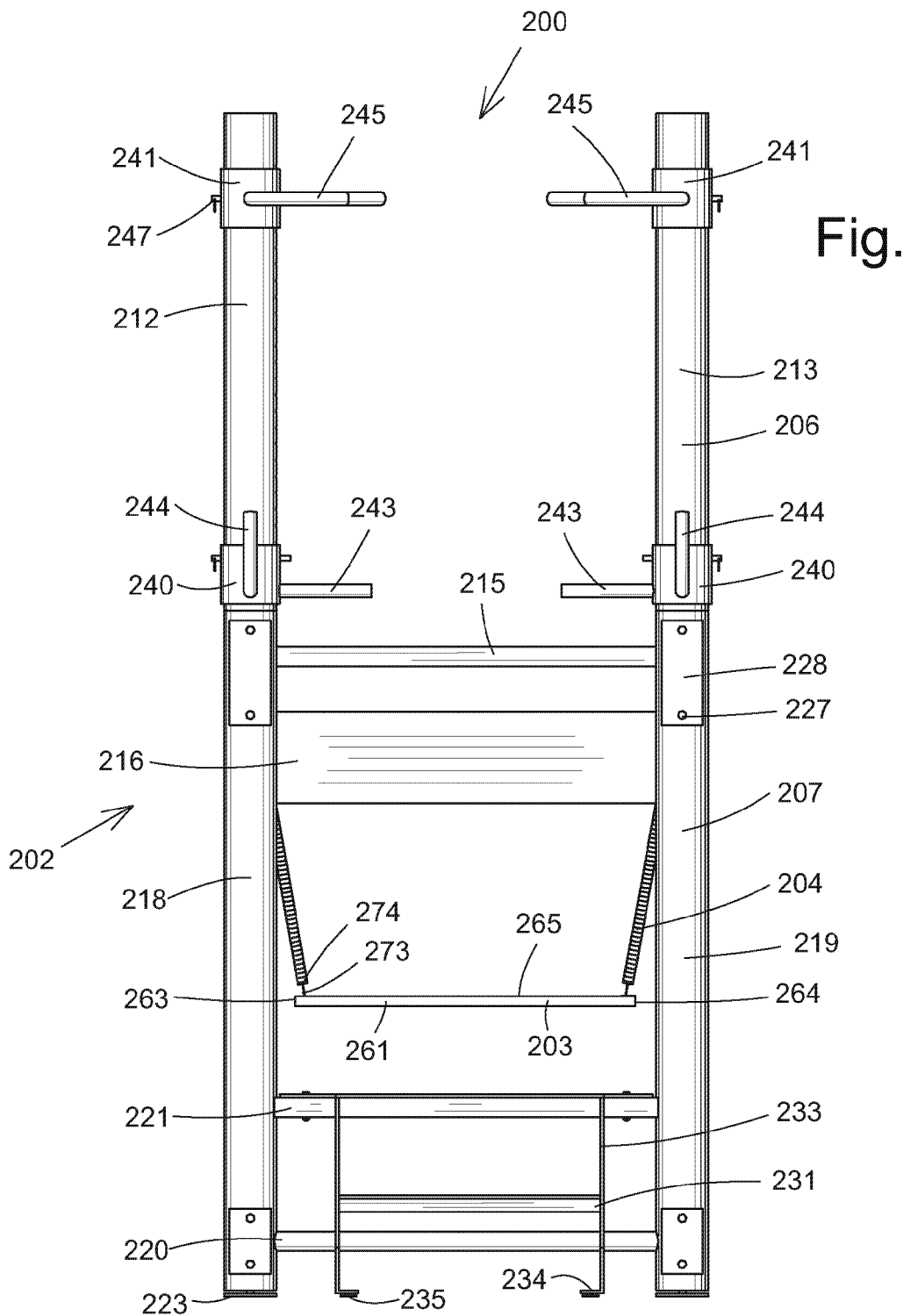
FIG. 23 is a rear elevational view of the rebound training device shown in FIG. 20.
Figure 24:
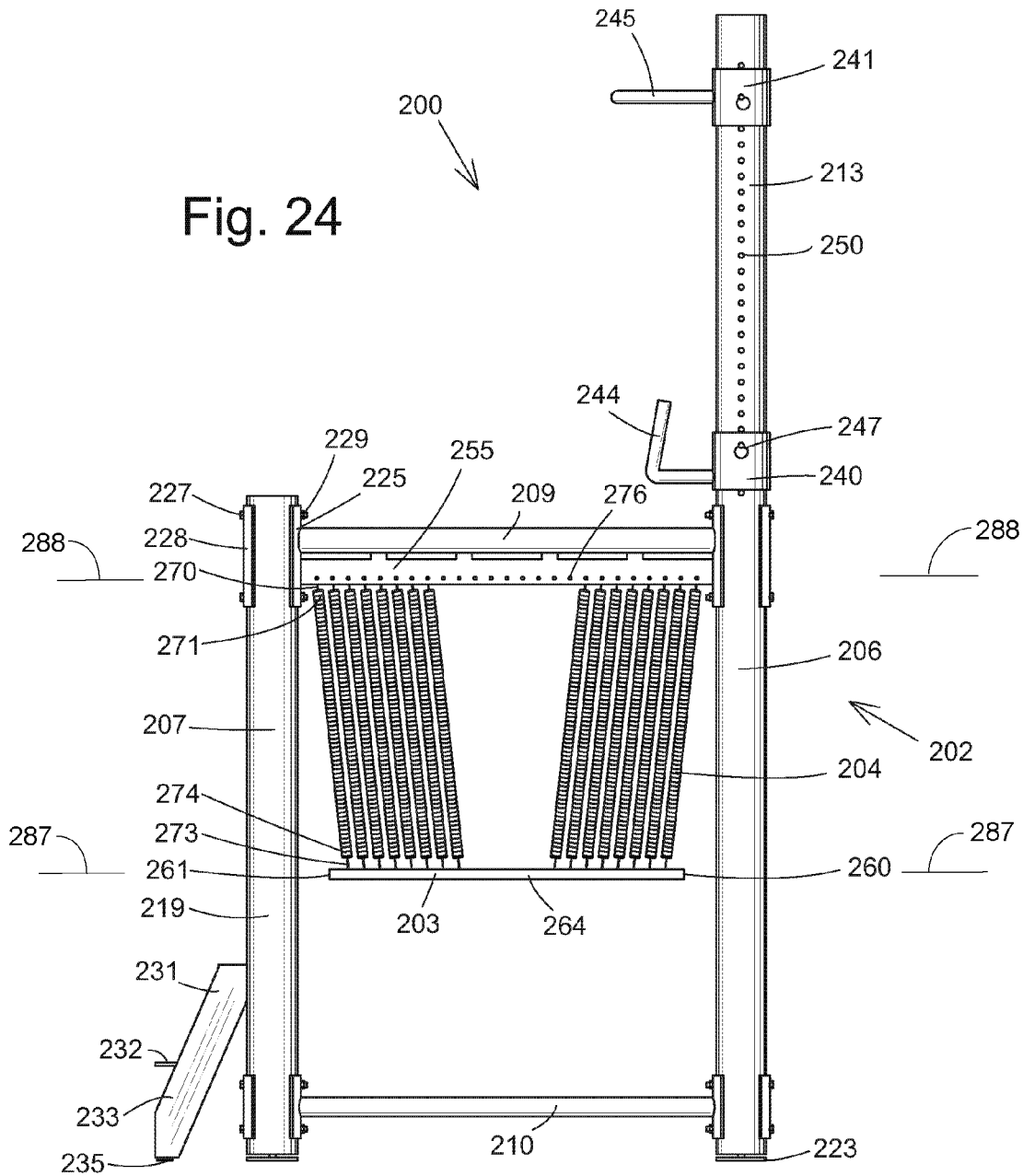
FIG. 24 is a left side elevational view of the rebound training device shown in FIG. 20.
Figure 25:
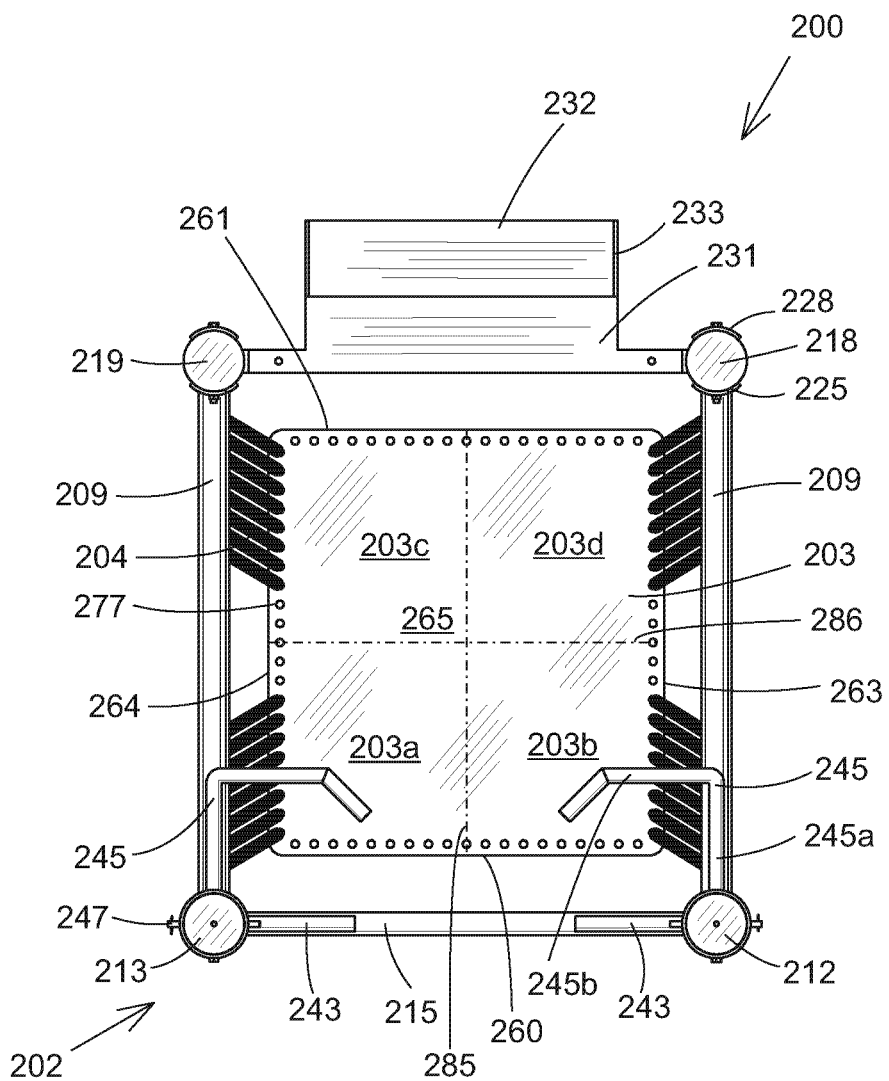
FIG. 25 is a top plan view of the rebound training device shown in FIG. 20.
Figure 26:
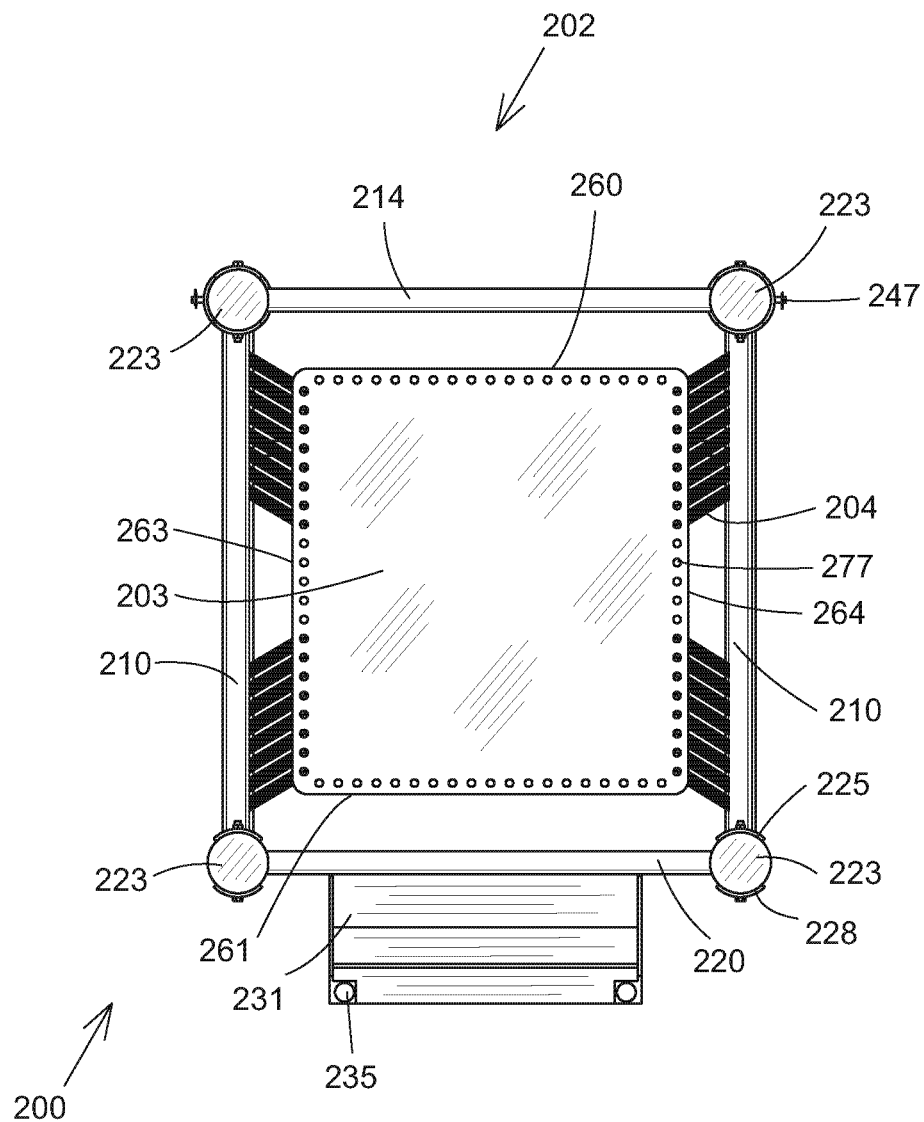
FIG. 26 is a bottom plan view of the rebound training device shown in FIG. 20.

In FIGS. 14-16, a fifth embodiment of a rebound training device, generally designated 100, is seen to include a frame structure, generally designated 101, a footboard 102, and a plurality of resilient elements, collectively designated 103, suspending the footboard 102 from the frame structure 101. Herein, the frame structure 101 includes tubular, rectangular side frames 105*a* and 105*b* connected by upper and lower cross members 106*a* and 106*b*. Corner braces, collectively designated 108, or gussets, are fixed at the corners of the frame structure 101 to minimize racking and provide structural rigidity. Herein, the side frames 105*a* and 105*b* are formed from 2-inch square tube. The frame structure 101, excluding the cross member, handlebars and step, is approximately 42 inches wide, 42 inches long and 48 inches high.

Mounted within the frame structure are a series hand grip members that include a cross member 110 and a pair of spaced side rails 111*a* and 111*b* extending from the cross member 110 rearwardly to side attachments 112*a* and 112*b* and then converging inwardly and downwardly to a bottom end to steps 115 located at the back of the training device 100. Spaced user front handlebars 116*a* and 116*b* extend upwardly and forwardly from the cross member 110 at an angle of approximately 30° from vertical. User side handlebars 117*a* and 117*b* rearward of the cross member 110 extend upwardly and outwardly from respective side rails 111*a* and 111*b*. The handlebars are formed from 1.5-inch round tube.

As seen in the FIGS. 14-16, the resilient elements 103 include hooks 120 at their respective ends that extend between and engage respective horizontal hanger bars 121*a* and 121*b* located below the upper side frame upper portions and an array of spaced holes, collectively designated 123, along the peripheral edges 125 of the footboard 102. Horizontal placement of the hooks 120 along the hanger bars 121*a* and 121*b* may be maintained by placing optional spacers (not shown) between the individual hooks 120.

In FIGS. 17-19, a sixth embodiment of a rebound training device, generally designated 130, is seen to include a frame structure, generally designated 131, a footboard 132, and a plurality of resilient elements, collectively designated 133, suspending the footboard 132 from the frame structure 131. Herein, the frame structure 131 includes tubular, rectangular side frames 135*a* and 135*b* connected by upper and lower cross members 136*a* and 136*b*. Corner braces, collectively designated 138, or gussets, are fixed at the corners of the frame structure 131 to minimize racking and provide structural rigidity. Herein, the side frames 135*a* and 135*b* are formed from 2-inch square tube. The frame structure 131, excluding the handlebars and step, is approximately 48 inches wide, 48 inches long and 48 inches high.

Mounted across the top of the frame structure 131 between the top elements 140*a* and 140*b* of respective side frames 135*a* and 135*b* is cross member 142. Spaced user front handlebars 143*a* and 143*b* extend upwardly and forwardly from the cross member 142 at an angle of approximately 30° from vertical. The top elements 140*a* and 140*b* extend rearwardly and then converging inwardly and downwardly to a bottom end at step 145 located at the back of the training device 130.

As seen in the FIGS. 17-19, the resilient elements 133 include hooks 147 at their respective ends that extend between and engage horizontal hanger bars 148 located below respective top elements 140*a* and 141*b* of the side frames 135*a* and 135*b* and respective holes 149 arrayed along the peripheral edges 150 of the footboard 132.

In the embodiment shown in FIGS. 20-28, the rebound device, generally designated 200, includes a frame 202, a rigid footboard 203, and a plurality of resilient elements, such as extension springs, collectively designated 204, suspending the footboard 203 within the frame 202. The frame 202 may rest on and be supported by a floor (not shown).

The frame 202, which has a generally rectangular footprint and can be partially disassembled, includes forward and rearward subframes 206 and 207, respectively, maintained in spaced relation by upper and lower horizontal cross members 209 and 210 acting as braces at the lateral sides.

The forward side subframe 206 is comprised of a pair of tall, closed-end, vertical, cylindrical tubular frame members, or uprights 212 and 213, with a lower round tube 214 and an upper square tube 215 acting as braces at the forward side to maintain the uprights 212 and 213 in spaced relation. A flat cross plate 216 is included to provide billboard space for display of branding information or other indicia.

The rearward side subframe 207 is comprised of a pair of shorter, closed-end, vertical, cylindrical tubular frame members, or uprights 218 and 219, with a lower round tube 220 and an upper square tube 221 acting as braces at the rearward side to maintain the uprights 218 and 219 in spaced relation and providing a rear opening allowing the user access into the frame interior.

At the bottom end of the upright tubes are round stabilizer feet 223 having threaded studs (not numbered) that may be screwed into threaded holes (not shown) in the tube bottoms providing leveling capability.

The upper and lower horizontal cross frame members 209 and 210 comprise round tubes having arcuate mounting plates 225 at each end that are fixed to its respective upright by pairs of bolts 227. Each bolt 227 extends, in turn, through aligned holes in an arcuate backing plate 228, the vertical upright, and the mounting plate 225, and is secured by a nut 229 threaded thereon. The upper cylindrical cross member tubes 209, which function as lateral handgrips, have slightly greater diameters than the lower cylindrical cross member tubes 210.

Steps, generally designated 231, provide a climbing structure leading up to the rear opening and are supported by the rear upper tube 221 and include treads 232 extending between a pair of stringers 233 that have turned-in feet 234. Adjustable levelers 235 having threaded studs are screwed into the bottoms of the feet 234. The steps 231 are attached to the rearward subframe 207 and generally extend between the uprights 218 and 219 so that the uppermost step is at a height intermediate an unloaded elevated upper position, the elevation of the footboard when the user is not standing on it, and a lower position, the elevation closely adjacent the floor when the user is rebounding downwardly. Preferably, the top step is vertically located at the approximate height of the footboard when the user is standing at rest on the footboard. This enables the user to easily step on and off the footboard 203.

Slidably mounted in telescopic fashion to each of the upper parts of the front uprights 212 and 213 above the hangers of cross members 209 are lower and upper handholds 240 and 241, which comprise short circular tubes from which handgrips 243, 244 and 245 extend that may be grasped by a user. The handholds 240 and 241 are movable between and releasably securable at a plurality of vertical positions. The handholds 240 and 241 may be locked in any selected vertical position by inserting quick release pins 247 through holes 248 in the handhold tubes when aligned with holes, collectively designated 250, vertically spaced along the uprights 212 and 213 and extending therethrough.

The lower handholds 240 include a first cylindrical handgrip 243 extending radially outward and a second handgrip 244 having an inner radially-extending cylindrical segment 244a and an outer cylindrical upright segment 244b that is slightly tilted from vertical.

Figure 27:
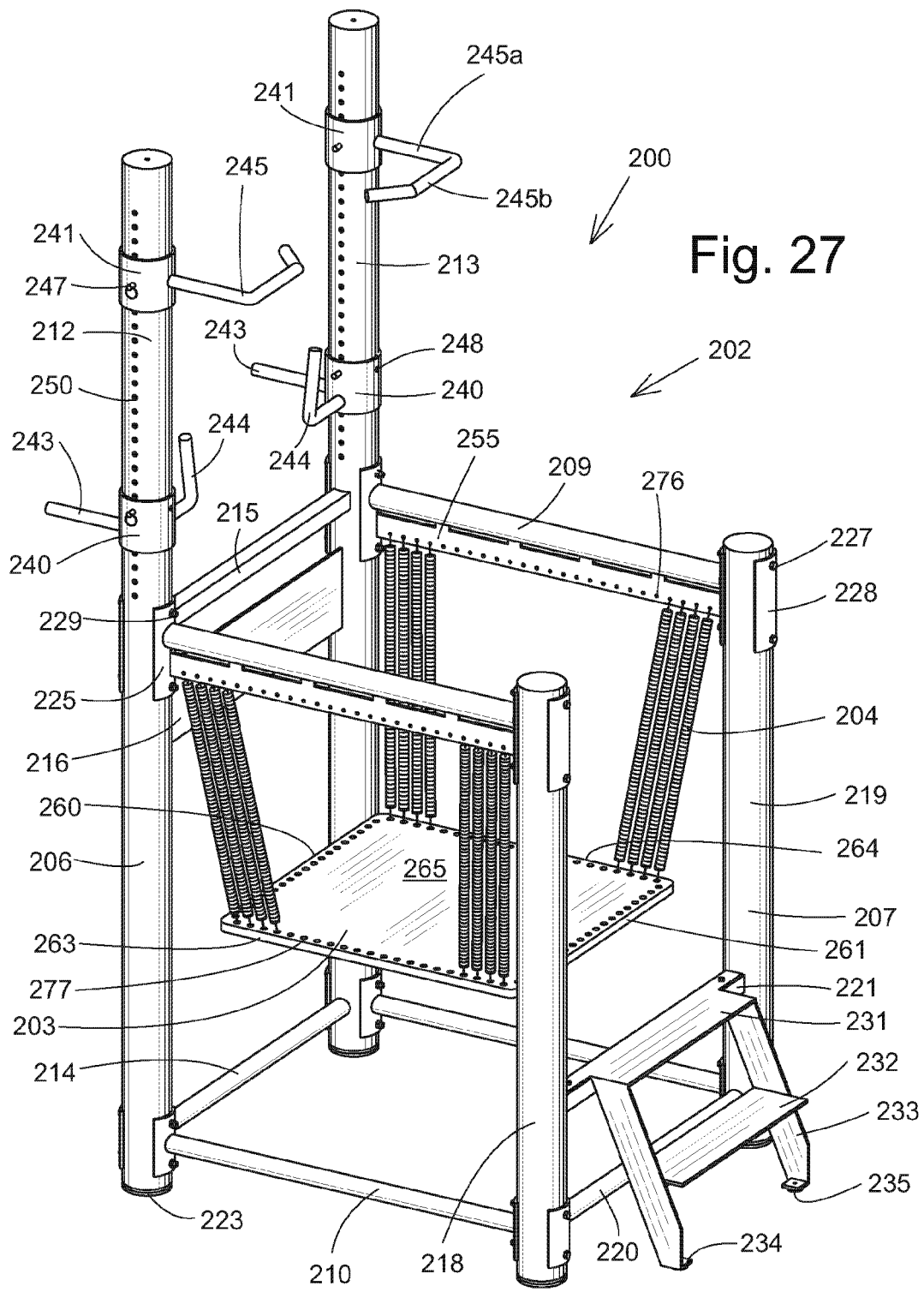
FIG. 27 is a rear, side isometric view of the rebound training device shown in FIG. 20 with some of the spring elements removed and handles adjusted.
Figure 28:
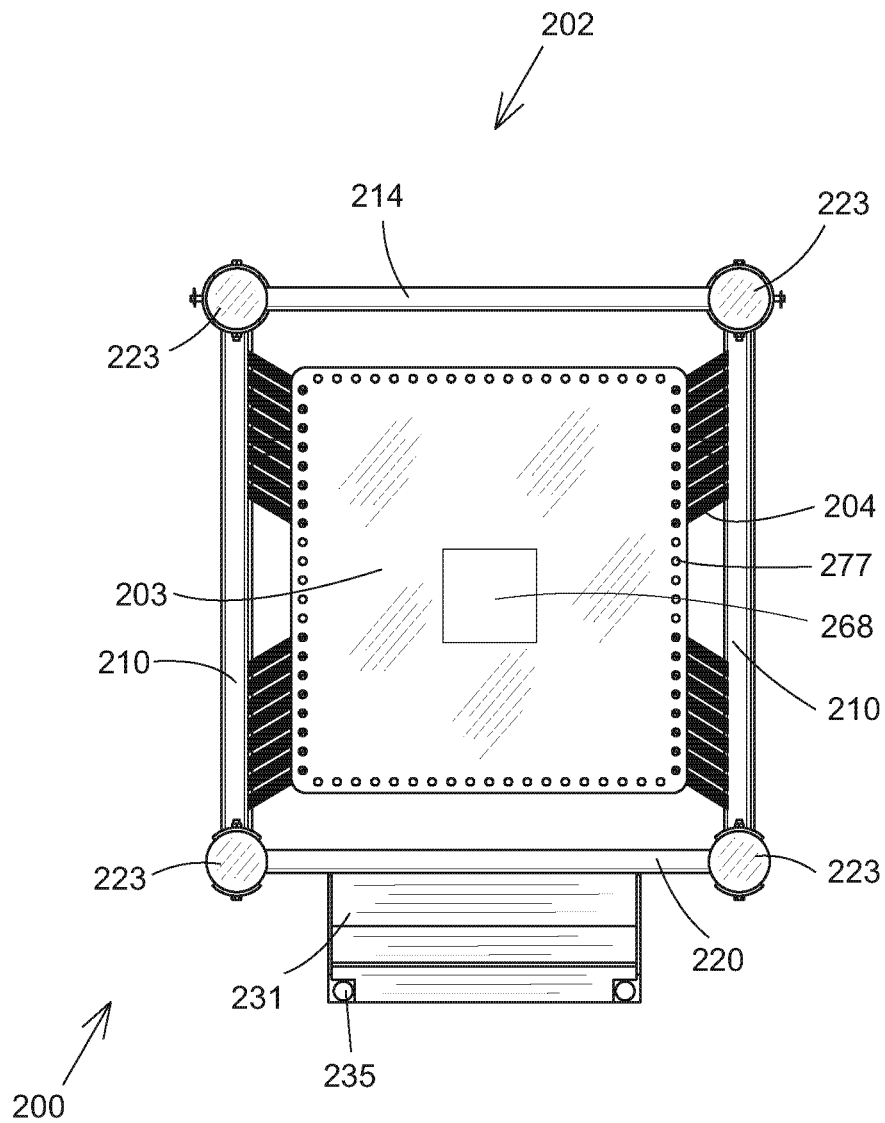
FIG. 28 is a bottom plan view of a eighth rebound training device similar to FIG. 20 embodying the principles of the invention and showing a vibrator attached to the footboard.
Figure 29:
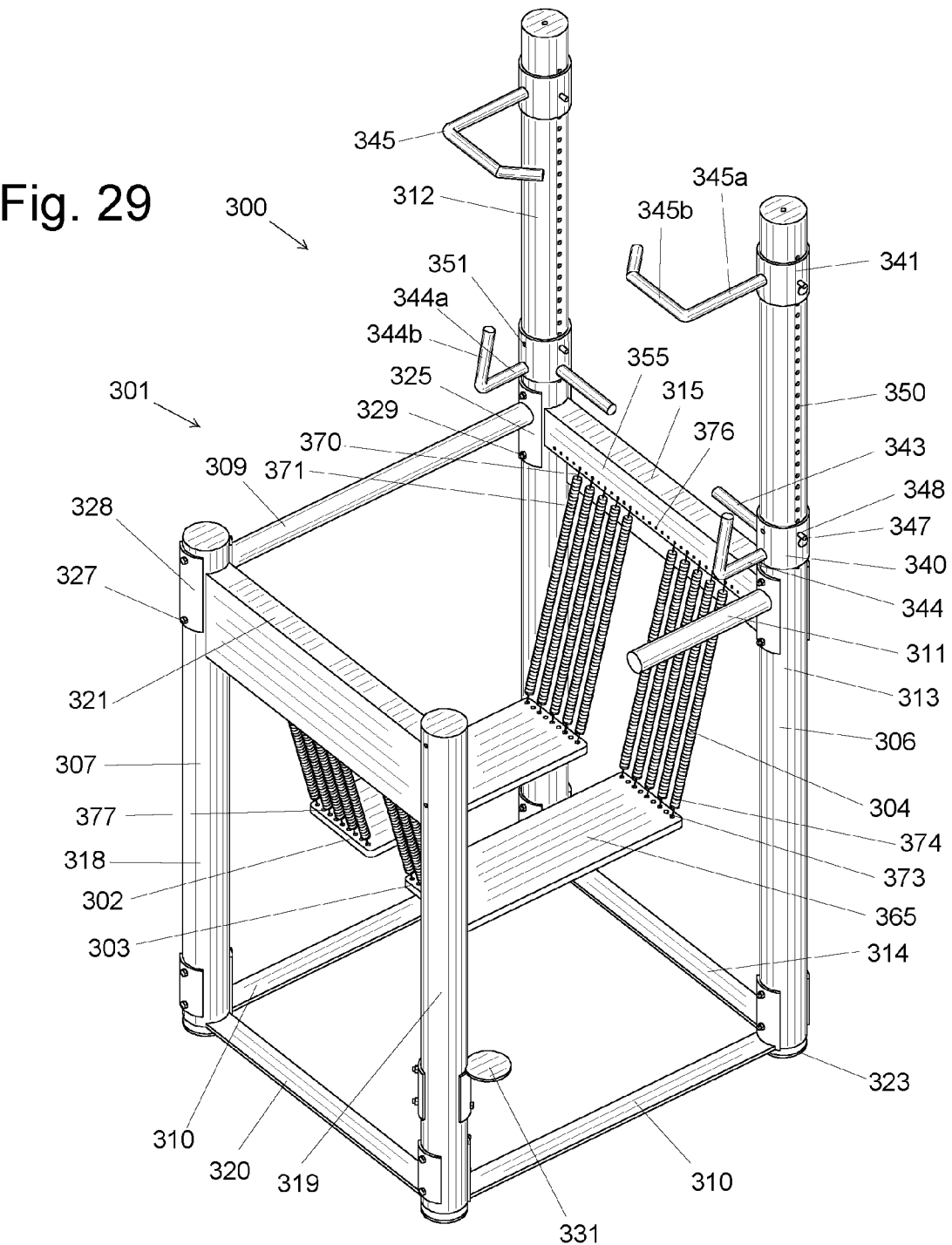
FIG. 29 is a rear, side isometric view of a eighth rebound training device embodying the principles of the invention and having a pair of footboards.
Figure 30:
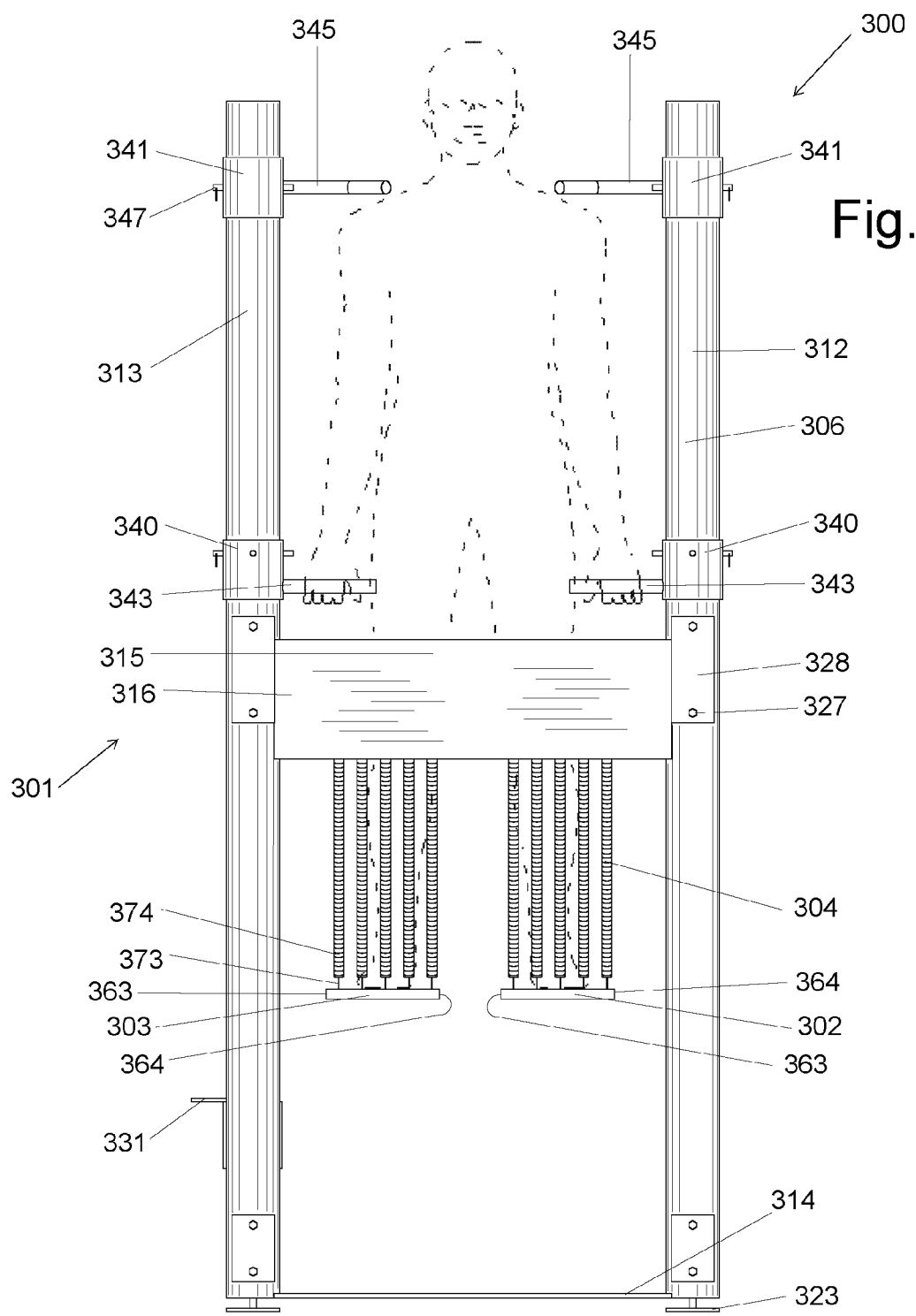
FIG. 30 is a front elevational view of the rebound training device shown in FIG. 29.
Figure 31:
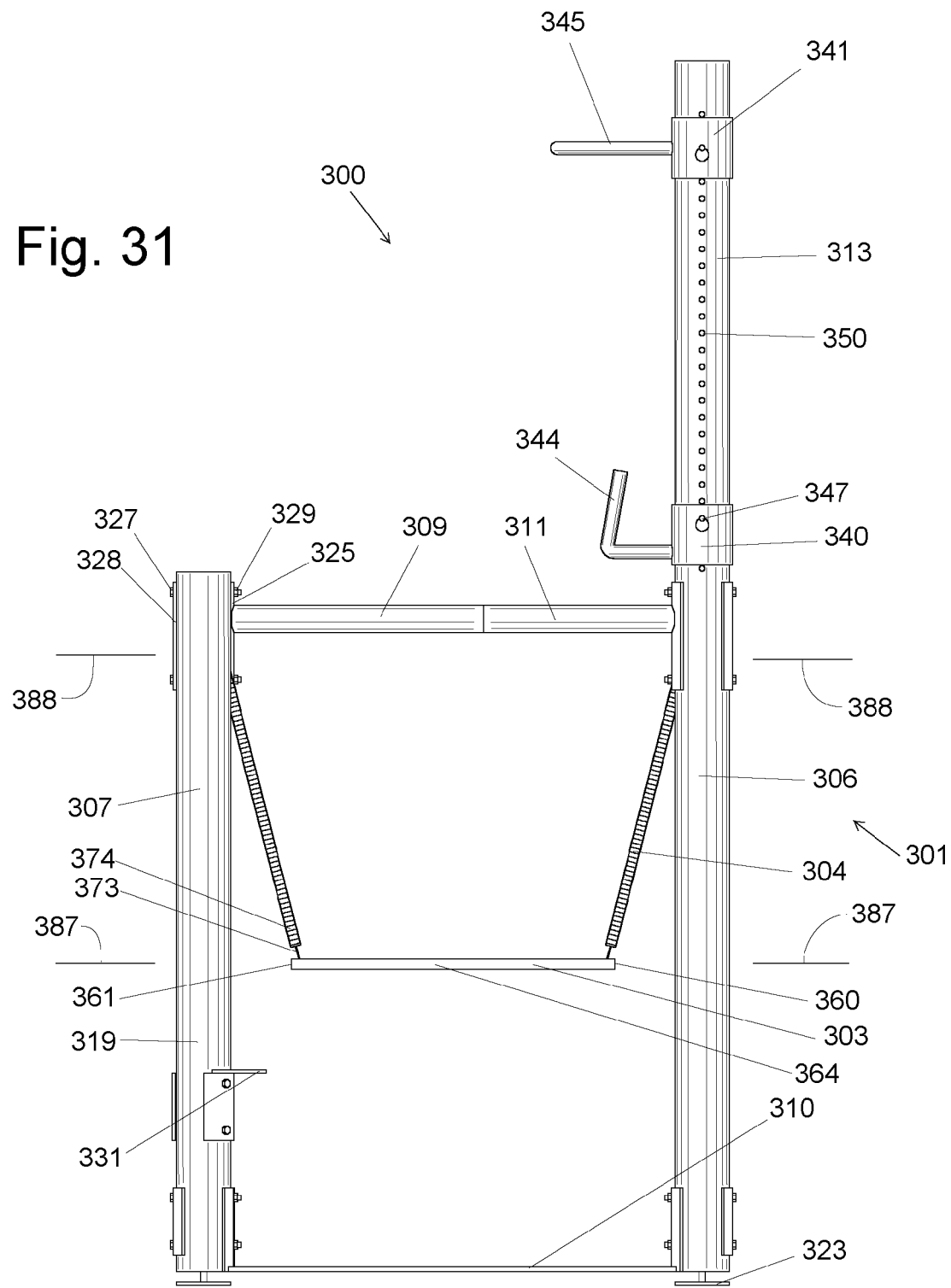
FIG. 31 is a left side elevational view of the rebound training device shown in FIG. 29.

The upper handholds 241 have a handgrip 245 with an inner radially-extending segment 245a and a bent outer transverse horizontal segment 245b. Additional holes 251 are defined in the handholds 240 so that they may be rotated 90° reorienting the handholds 240 relative to the user as seen in FIG. 27. The handholds 240 and 241 may be moved or flipped or rearranged or removed as the user desires to facilitate comfortable gripping thereof.

Below the respective upper cross members 209 and comprising a portion of the frame 202 are hanger bars 255 which extend horizontally between the mounting plates 225. The hanger bars 255 may be fixed to the upper cross member mounting plates 225 or the bottom of the upper cross members 209, or both.

Suspended below the hanger bars 255 is the rectangular, rigid footboard 203, which is a foot support member having peripheral edges including spaced forward and rearward edges 260 and 261 and spaced lateral edges 263 and 264 extending therebetween at each side to define a width. The footboard has a single, flat planar horizontal upper surface 265 upon which the user stands and which extends continuously between the peripheral edges where the spring elements are attached. The footboard 302 being rigid and of sufficient size to be at least coextensive with both feet of a user regardless of where on the footboard the user places his feet insures good stable support for the standing user. An optional vibrator 268 shown in the embodiment of FIG. 28 may be secured to the footboard 203 to provide a therapeutic oscillating effect.

A plurality of parallel, side-by-side spring elements, such as extension springs 204, are arranged in two lateral series and extend between the hanger bars 255 and the footboard 203 at each side of the frame 202. The springs 204 are of equal length and have hooks 270 at their upper ends 271 for connecting with the hanger bars 255 of the frame 202 and hooks 273 at their lower ends 274 for connecting with the footboard 203. All of the springs 204 are similar so that they are interchangeable with one another and can be located in any desired position on the frame. The spring elements may be made of stainless steel, music wire, or other metal and may also be made of any elastic-type material, including rubber straps, elastic bands, bungees, and the like as previously described.

The springs 204 are of a number, length and strength to support the footboard 203 above the floor at an elevated height above the steps, which may not be easily reached without the steps, a lowest height closely adjacent the floor when the user is rebounding downwardly, and an intermediate height between the elevated and lowest height when the user is standing on the footboard 203 and not rebounding.

A series of connection holes, collectively designated 276, are defined in the margins of the lower edges of the hanger bars 255 and releasably receive the connection hooks at the upper ends 271 of the springs 204. Similarly, a series of holes, collectively designated 277, are defined in the margins of the footboard 203 and releasably receive the connection hooks at the lower ends 274 of the springs 204. The footboard holes 277 are arranged seriatim such that at least two holes lie in spaced relation each of the four quadrants 203a,b,c,d and extend linearly along the lateral margin of the footboard.

It is understood that when a footboard having unequal length and width is rotated 90°, the width of the footboard relative to the frame is changed, thereby changing the lateral spacing of the holes and altering the longitudinal and lateral stability of the suspended footboard.

The upper spring hooks 270 and the hanger holes 276 comprise a first plurality of connecting fasteners that include separable cooperating interlocking fastener parts and define multiple spaced connection points. Similarly, the lower spring hooks 273 and the footboard holes 277 comprise a second plurality of connecting fasteners that include separable cooperating interlocking fastener parts and define multiple spaced connection points.

The number of connection points in the footboard 203 and a corresponding number in the hanger bars 255 enable the user to easily increase or decrease springs 204 as desired by manually associating or dissociating the fastener parts to include or exclude springs from the rebound device. The number of footboard connection points should at least correspond to the maximum number of springs that might be attached with a corresponding number in the hanger bars. Typically, the number of attached springs will be eight or more with four being a practical lower limit. One spring being attached at each corner of the footboard with additional springs being attached intermediate the corner springs. When two or more springs 204 are used in each quadrant, the footboard 203 is still supported even if a spring should become disconnected or broken.

Preferably, the holes 276 in the hanger bars 255 and the holes 277 in the footboard 203 are spaced at regular intervals along straight lines, the intervals being the same for the hanger bars 255 and the footboard 203. The footboard connection points are aligned along straight lines lying on a first horizontal plane as indicated by lines 287 and the hanger connection points are aligned along straight lines parallel to the footboard connection points and lie on a second horizontal plane indicated by lines 288 above and parallel to the first plane with the springs extending seriatem horizontally along the lateral side periphery of the rebound device 200. On each lateral side of a footboard 203, a series of holes extends rearward from the front edge spaced from another series extending forwardly from the rear edge.

When springs 204 of equal length are extended between the hanger bars 255 and the footboard 203 and suitably arranged, the top surface 265 of the footboard 203 will be horizontal permitting a user to stand upright on the footboard 203 when the rebound device 200 is mounted. The springs 204 which extend downwardly and inwardly from the hanger bars 255 to the footboard lateral side edges so as to define an angle less than 45° relative to vertical, and, preferably, an angle in a range between 0° and 15°, and most preferably, between 5° and 10°. This inward slant provides opposing lateral tension tending to stabilize the footboard 203 laterally while simultaneously providing upward force opposing the downward weight and momentum of the user. This spring slant also provides an expanding opening for the user to position himself. It should also be understood that the outer diameter of the springs is sufficiently small to permit a large number of springs to be aligned along the hanger bars or the footboard edge.

In the embodiment shown in FIGS. 20-28, the springs 204 are attached by open-end hooks inserted into predefined holes 276 and 277. It is understood that there are many mechanisms that may be used to easily attach and detach springs manually from the frame and footboard and it understood that any of them will suffice to function herein. For example, the connections might utilize the zigzag hanger loops shown in FIGS. 1-8, the hanger rod shown in FIG. 9-19, or the spring hooks shown in 14-19. Besides holes, other types of hook connections might be employed, such as posts, pins, shoulder screws, clips, rings, eyelets, U-bolts, open loops, and the like. When using connections without defined spacing, separators or spacers might be included between the adjacent hooks to maintain regular intervals so that horizontal spacing is the same along the hanger and the footboard.

In the embodiment shown in FIGS. 29-32, the rebound device, generally designated 300, includes a frame 301, a pair of rigid footboards 302 and 303, and a plurality of resilient elements, such as extension springs, collectively designated 304, suspending the footboards within the frame 301. Herein, a user places each foot on a separate footboard so that his feet and legs and be moved independently rather than together.

The frame 301, which has a generally rectangular footprint and can be partially disassembled, includes forward and rearward subframes 306 and 307, respectively, maintained in spaced relation by upper cylindrical cross member 309 and lower flat cross members 310 acting as horizontal braces at the lateral sides. Short cylindrical member 311 having one end fixed to the front subframe 306 and cross member 309 act as lateral handholds.

The forward side subframe 306 is comprised of a pair of tall, closed-end, vertical, cylindrical tubular frame members, or uprights 312 and 313, with a lower flat member 314 and an upper inverted J-shaped member 315 acting as braces at the forward side to maintain the uprights 312 and 313 in spaced relation. The tall outer plate portion 316 of J-shaped member 315 provides billboard space for display of branding information or other indicia.

The rearward side subframe 307 is comprised of a pair of shorter, closed-end, vertical, cylindrical tubular frame members, or uprights 318 and 319, with a lower flat member 320 and an upper J-shaped member 321 acting as braces at the rearward side to maintain the uprights 318 and 319 in spaced relation. The J-shaped member 321 may also be used as billboard space.

At the bottom end of the upright tubes are round stabilizer feet, collectively designated 323, having threaded studs (not numbered) that may be screwed into threaded holes (not shown) in the tube bottoms providing leveling capability.

The upper and lower horizontal cross frame members 309 and 311 comprise round tubes having arcuate mounting plates 325 at each end that are fixed to its respective upright by pairs of bolts 327. Each bolt 327 extends, in turn, through aligned holes in an arcuate backing plate 328, the vertical upright, and the mounting plate 325, and is secured by a nut 329 threaded thereon. The upper cylindrical cross members 309 and 311 function as lateral handgrips.

A footstep 331 is bolted to the upright 319 providing entry to the access opening defined by the free end of short cylindrical member 311 and the upright 319. The footstep 331 is vertically positioned so that it is at a height intermediate an unloaded elevated upper position, the elevation of the footboards when the user is not standing on them, and a lower position, the elevation closely adjacent the floor when the user is rebounding downwardly. This enables the user to easily step on and off the footboards.

Slidably mounted in telescopic fashion to each of the upper parts of the front uprights 312 and 313 above the hangers of J-shaped member 315 are lower and upper handholds 340 and 341, which comprise short circular tubes from which handgrips 343, 344 and 345 extend that may be grasped by a user. The handholds 340 and 341 are movable between and releasably securable at a plurality of vertical positions. The handholds 340 and 341 may be locked in any selected vertical position by inserting quick release pins 347 through holes 348 in the handhold tubes when aligned with holes 350 vertically spaced along the uprights 312 and 313 and extending therethrough.

The lower handholds 340 include a first cylindrical handgrip 343 extending radially outward and a second handgrip 344 having an inner radially-extending cylindrical segment 344a and an outer cylindrical upright segment 344b that is slightly tilted from vertical.

The upper handholds 341 have a handgrip 345 with an inner radially-extending segment 345a and a bent outer transverse horizontal segment 345b. Additional holes 351 are defined in the handholds 340 so that they may be rotated 90° reorienting the handholds 340 relative to the user. The handholds 340 and 341 may be moved or flipped or rearranged or removed as the user desires to facilitate comfortable gripping thereof.

The respective inner short sides 355 of the J-shaped members 315 and 321 define hangers at the forward and rearward sides of the rebound device 300 that extend horizontally between the front uprights 312 and 313 and between the rear uprights 318 and 319. A linear series of perofrations or holes, collectively designated 376, are defined in the margins of the short sides 355.

Suspended side-by-side below the J-shaped members 315 and 321 are the rectangular, rigid footboards 302 and 303, which are foot support members, each of which has peripheral edges including spaced forward and rearward side edges 360 and 361 defining a footboard length and respective spaced lateral side edges 363 and 364 defining a footboard width. Each footboard has a single, flat planar horizontal upper surface 265 upon which the user stands and which extends continuously between the peripheral edges where the spring elements are attached. Each footboard 302 and 303 being rigid and of sufficient size to support a user's foot regardless of where on the footboard the user places his foot insures good stable support for the standing user.

A plurality of parallel, side-by-side spring elements, such as extension springs 304, are arranged in to extend from respective hangers to the forward and rearward periphery of each of the footboard 302 and 303. The springs 304 are of equal length and have hooks 370 at their upper ends 371 for connecting with the hanger holes of the J-shaped members and hooks 373 at their lower ends 374 for connecting with the footboards 302 and 303. The spring elements may also be made of any elastic-type material, including rubber straps, elastic bands, bungees, and the like as previously described.

The springs 304 are of a number, length and strength to support the footboards 302 and 303 above the floor at an elevated height above the footstep 331, which may not be easily reached without the footstep 331, a lowest height closely adjacent the floor when the user is rebounding downwardly, and an intermediate height between the elevated and lowest height when the user is standing on the footboard 302 and 303 and not rebounding.

A linear series of holes 376 are defined in the margins of the lower edges of the hangers and releasably receive the hooked upper ends 371 of the springs 304. Similarly, a series of holes 377 are defined in the margins of the footboards 302 and 303 and releasably receive the hooked lower ends 374 of the springs 304. The footboard holes 377 are arranged seriatim such that at least two holes lie in spaced relation in each of the four footboard quadrants defined by centerlines 385a and 385b and extend linearly along the lateral margin of the footboards. On each lateral side of a footboard, a series of holes extends rearward from the front edge spaced from another series extending forwardly from the rear edge.

The upper spring hooks 370 and the hanger holes 376 comprise a first plurality of connecting fasteners that include separable cooperating interlocking fastener parts and define multiple spaced connection points. Similarly, the lower spring hooks 373 and the footboard holes 377 comprise a second plurality of connecting fasteners that include separable cooperating interlocking fastener parts and define multiple spaced connection points.

The number of connection points in the footboards 302 and 303 and a corresponding number in the J-shaped hangers enable the user to easily increase or decrease springs 304 as desired by manually associating or dissociating the fastener parts to include or exclude springs from the rebound device. The number of footboard connection points should at least correspond to the maximum number of springs that might be attached with a corresponding number in the hangers. Typically, the number of attached springs will be eight or more with four being a practical lower limit. When two or more springs 304 are used in each quadrant, a footboard is still supported if a spring should become disconnected or broken.

Preferably, the holes 376 in the hangers and the holes 377 in the footboards 302 and 303 are spaced at regular intervals along straight lines, the intervals being the same for the hangers and the footboards. The footboard connection points are aligned along straight lines lying on a first horizontal plane as indicated by lines 387 and the hanger connection points are aligned along straight lines parallel to the footboard connection points and lie on a second horizontal plane as indicated by lines 388 above and parallel to the first plane with the springs extending seriatem horizontally along the lateral side of the rebound device.

When springs 304 of equal length are extended between the hangers and the footboards 302 and 303 and suitably arranged, the top surface of the footboard 302 and 303 will be horizontal permitting a user to stand upright on the footboards 302 and 303 when the rebound device 300 is mounted. The springs 304 which extend downwardly and inwardly from the hangers to the footboard lateral side edges so as to define an angle less than 45° relative to vertical, and, preferably, an angle in a range between 0° and 15°, and most preferably, between 5° and 10°. This inward slant provides opposing lateral tension tending to stabilize the footboards 302 and 303 lengthwise while simultaneously providing upward force opposing the downward weight and momentum of the user.

Figure 32:
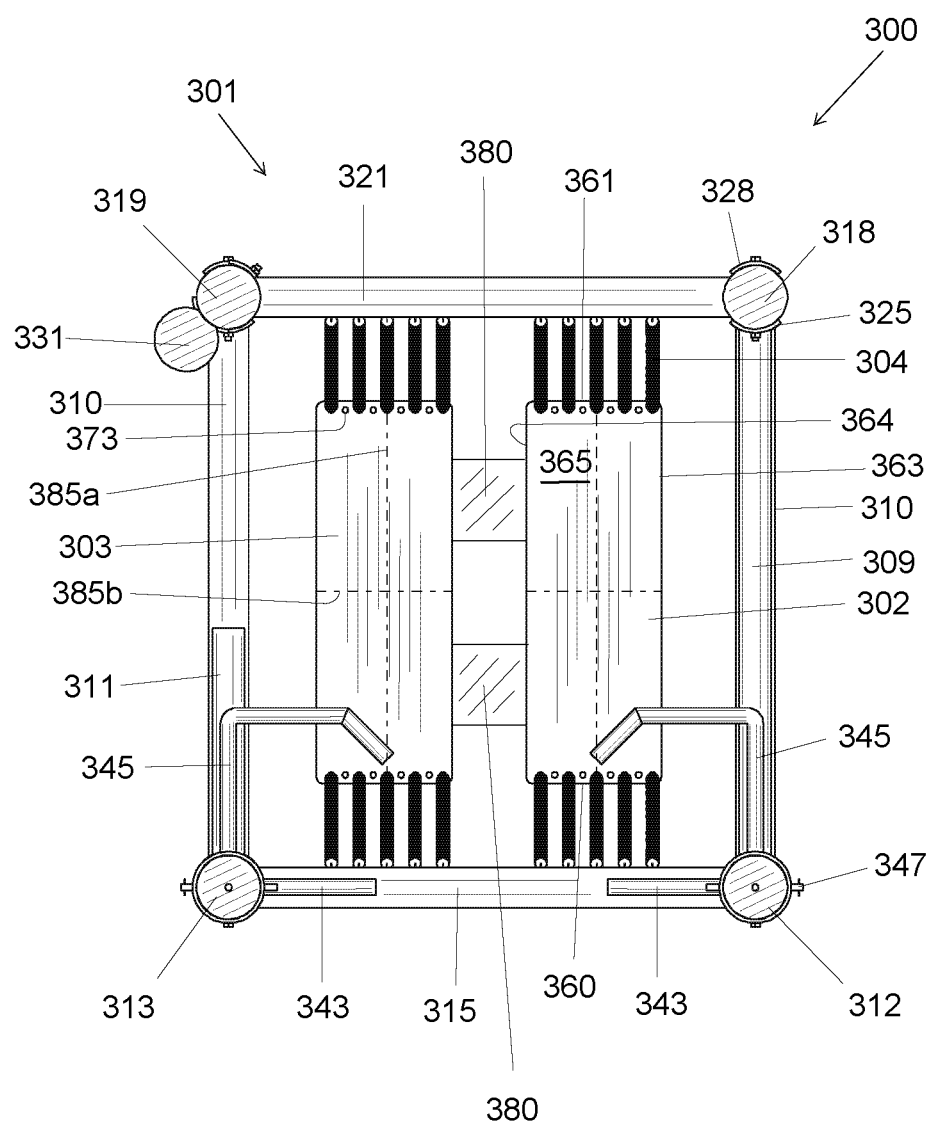
FIG. 32 is a top plan view of the rebound training device shown in FIG. 29 showing optional footboard connecting straps in phantom.

Optionally, resilient connecting straps 380 may be suitably attached and extended between the footboard 302 and 303 as shown in FIG. 32. The straps 380 limit relative movement between the footboards and help stabilize the rebounding action.

As shown in FIG. 33, a rigid, rectangular foot support board, or footboard 400, has a length L and a width W. The footboard 400 has a forward outer peripheral edge 402, a rearward outer peripheral edge 403 spaced from the forward edge 402, and spaced, parallel, lateral side outer peripheral edges 404 and 405 extending between the respective ends of the forward edge 402 and the rearward edge 403. Inwardly adjacent the forward edge 402 and the rearward edge 403 are longitudinal end margins, 412 and 413, respectively, and inwardly adjacent the side edges 404 and 405 are lateral side margins, 414 and 415, respectively, that together form the peripheral margin portion 420 of the footboard 400.

Extending between the longitudinal end margins 412 and 413 and the lateral side margins 414 and 415 is the interior portion 425 of the footboard 400 having a horizontal, upwardly exposed, planar, supporting top surface 426. The peripheral margin portion 420 of the footboard 400 lies adjacent the peripheral outer edges 402-405 and is circumjacent to the interior portion 425 to define the perimeter of the interior portion 425.

The top surface 426 has a surface area of length a and width b at least spanning the area underlying both feet 428 (shown in phantom) of a user standing centrally thereon. The top surface 426 extends dimensionally without a break at least the entire length and breadth of the user's full stance. That is, the entire top surface area extending inward from the margins 412-415 is closed and filled, i.e., there are no openings or voids in the supporting top surface 426.

Formed in each of the side margins 412 and 413 inward of the side edges 402 and 403 is an array of vertical through holes, collectively designated 430, arranged in seriatim providing a plurality of connection points through which the spring hooks are positioned. Each array has a forward hole 430a near the forward edge 402 and a rearward hole 430b near the rearward edge 403 with at least one additional hole, one of which is designated 430c, linearly aligned with and intermediate the forward hole 430a and the rearward hole 430b. The holes are arranged so as to on opposite sides of the footboard a line of connection points or positions for the lower ends of the springs, each being disposed under and parallel to the holes of the corresponding overlying hanger bar forming connection points or positions for the upper ends of the spring elements. Preferably, the hole arrays in the footboard and the frame hanger bars are all parallel to each other.

As shown in FIG. 34, a rigid, rectangular foot support board, or footboard 450, has a length L and a width W. The footboard 450 has a forward outer peripheral edge 452, a rearward outer peripheral edge 453 spaced from the forward edge 452, and spaced, parallel, lateral side outer peripheral edges 454 and 455 extending between the respective ends of the forward edge 452 and the rearward edge 453. Inwardly adjacent the forward edge 452 and the rearward edge 453 are longitudinal end margins, 462 and 463, respectively, and inwardly adjacent the side edges 454 and 455 are upright side walls 457 and 458, respectively, defining the lateral side margins 464 and 465, respectively, that together form the peripheral margin portion 470 of the footboard 450.

Extending between the longitudinal end margins 462 and 463 and the lateral side margins 464 and 465 is the interior portion 475 of the footboard 450 having a horizontal, upwardly exposed, planar, supporting top surface 476. The peripheral margin portion 470 of the footboard 450 lies adjacent the peripheral outer edges 452-455 and is circumjacent to the interior portion 475 to define the perimeter of the interior portion 475.

The top surface 476 has a surface area of length a and width b at least spanning the area underlying both feet 478 (shown in phantom) of a user standing centrally thereon. The top surface 476 extends dimensionally without a break at least the entire length and breadth of the user's full stance. That is, the entire top surface area extending inward from the margins 462-465 is closed and filled, i.e., there are no openings or voids in the supporting top surface 476.

Formed in each of the margin side walls 457 and 458 is an array of horizontal through holes, collectively designated 480, arranged in seriatim providing a plurality of connection points through which the spring hooks are positioned. Each array has a forward hole 480a near the forward edge 452 and a rearward hole 480b near the rearward edge 453 with at least one additional hole, one of which is designated 480c, linearly aligned with and intermediate the forward hole 480a and the rearward hole 480b. The holes are arranged so as to form on opposite sides of the footboard a line of connection points or positions for the lower ends of the springs, each being disposed under and parallel to the holes of the corresponding overlying hanger bar forming connection points or positions for the upper ends of the spring elements. Preferably, the hole arrays in the footboard and the frame hanger bars are all parallel to each other.

Selection of the individual spring elements and the number of springs used determine the overall rebound action of the device disclosed herein. As previously stated, springs may be added or removed to change the degree of motion and resistance and compensate for differences in the user's weight, strength, quickness, effort, and the like. To achieve an appropriate resistance, springs are manually removed or added, so that the effort—taking into account one's physical abilities—required to move the footboard over an appropriate distance can be readily adjusted so that the overall effect of the rebound motion is similar for all users.

A theoretical example of spring usage is shown in the three tables set forth in FIG. 35 wherein the number of springs is adjusted so that the deflection distance is more or less the same when adjusted for a user's weight and effort. Notably, a large person at rest will lower the footboard more than a small person. To compensate, more springs are used for a large person, less for a small person. For a child, perhaps 12 springs or less are used; for a small person, 16-20 springs; for an average person, 24-28 springs; for a strong, large person, 32 or more springs.

The distance a spring is stretched or deflected is directly proportional to the force applied and may be expressed by the formula, x=P/k, where x is the deflection or stretch under a load (in inches), P is the load (in pounds), and k is the spring constant (in pounds per inch). The amount of deflection is linear relative to the force applied. Conversely, the amount of force provided by a spring is given by the formula, P=kx. In the case of the rebound device disclosed herein, when the user forces the footboard downwardly, the footboard will rebound upwardly with an opposite force.

Extension springs, when manufactured, typically have an initial tension. Initial tension is the force tending to keep the spring coils together and is equal to the amount of force required to begin separation of the spring coils. Thus, taking into account the effects of initial tension, the deflection of a spring under load may be expressed by the formula, x=(P−IT)/k, where x is the distant the spring is deflected (in inches), P is the load (in pounds), IT is the initial tension, and k is the spring constant.

The spring constant for a wire extension spring can be expressed by the formula, $k=Gd^4/8ND^3$, where k is the spring constant, G is the modulus of elasticity (rigidity) for the spring material (in pounds per square inch), d is the wire diameter (in inches), N is the total number of active coils, and D is the mean diameter of the coil (in inches), the outside diameter of the coil minus the wire diameter.

As a result, the deflection of a single spring can be expressed by the formula, $$x = \frac{8(P-IT)ND^3}{Gd^4}$$

In a rebound device as shown which employs multiple extension springs, P is equal to the sum of the user's weight and the downward force divided by the number of springs. At the footboard bottom position, the extended spring generates an upward force driving the user vertically upward.

In the embodiments shown in FIGS. 20-32, the springs are long extension springs formed from close wound steel wire, or music wire, and have an undeflected coil length between 16 and 27 inches, preferably 20 to 23 inches. While an effective range of vertical motion of the footboard is between 0 and 24 inches downward or upward from the static middle position (the footboard position when the user is not moving), a preferred range is between 2 and 16 inches and the most preferred range is between 4 and 12 inches. Herein, an effective spring constant is between 0.25 and 2.5, a preferred spring constant is between 0.4 and 1, and a most preferred range is between 0.5 and 0.6.

The training device disclosed herein provides a rigid, horizontally-disposed footboard having a pair of opposite sides extending between a pair of opposite ends with a rigid, planar, upward facing closed support surface extending substantially from end-to-end and from side-to-side of sufficient size to fully support the entirety of both feet of a user regardless of where the user is standing within the footboard's margins during use. Springs having hook ends are releasably connected to the footboard extend upwardly and outwardly from holes formed the side margins of the footboard and are releasably connected to holes formed in the hanger bars. The springs at the sides block a user's feet from sliding sideways off of the footboard and resist lateral tipping. The number of springs can be modified to adjust spring force.

INDUSTRIAL APPLICABILITY

It should be apparent the rebound training device described herein is a simple, functional unit that is effective and easily manufactured.

Other aspects, objects and advantages of this invention can be obtained from a study of the drawings and the disclosure.

It should be understood that the terms "top," "bottom," "upper," "lower," "front," "back," "forward," "rearward," "side," "end," "first," "second," "height," "width," "length," "horizontal," "vertical," and similar terms as used herein, have reference only to the structure shown in the drawings and are utilized only to facilitate describing the invention. The terms and expressions employed herein have been used as terms of description and not of limitation.

From the foregoing, it will be observed that numerous variations and modifications may be effected without departing from the spirit and scope of the invention. It is to be understood that no limitation with respect to the specific apparatus illustrated herein is intended or should be inferred. While specific embodiments of the invention have been disclosed, one of ordinary skill in the art will recognize that one can modify the materials, dimensions and particulars of the embodiments without straying from the inventive concept.

What is claimed is:

1. A rebound and balance training device supported on a floor operable in response to action of a user standing thereon comprising:
   a rigid frame having forward and rearward ends and having a pair of elevated horizontal side frame members supported above the floor by a pair of vertical frame members attached to forward ends of the side frame members;
   a rigid foot support board having longitudinal forward and rearward edges, lateral side edges, a peripheral margin inwardly adjacent the edges, and a flat, upwardly facing surface in enclosing contact with the margin on which a user may stand;
   a plurality of elongate resilient elements of similar length extending between the side frame members and the foot support board and having connection hooks at each end; and
   a step structure attached to the frame at the rearward end of the rigid frame, opposite the vertical frame members, and having a top step located vertically near the lower second height,
   wherein each of the side frame members has an array of at least three hook-connection openings in the peripheral margin along the lateral edges linearly aligned on a horizontal plane,
   wherein the foot support board, at the surface adjacent each side edge, has an array of at least three hook-connection openings linearly aligned,
   wherein the hooks at the ends of the resilient elements are releasably connectable to the side frame member openings and the foot support board openings, so that the foot support board is resiliently suspended below the side frame members and above the floor in a horizontal orientation at a first height when no user is standing on the foot support board and at a lower second height when a user is standing on the foot support board,
   wherein resilient elements may be added or removed to adjust overall spring force in accordance with a user's weight and the forces the user applies during exercise, and
   wherein the device is configured such that the user may stand on the foot support board and extend the resilient elements to effect reciprocal vertical motion of the foot support board by applying force on the foot support board.

2. The rebound and balance training device of claim 1 further including a step structure attached to the frame at the end opposite the one pair of vertical frame members having a top step located vertically at approximately the lower second height.

3. The rebound and balance training device of claim 1, wherein the pair of vertical frame members extends vertically above the horizontal side frame members, and further including an outwardly extending handle on each of the vertical frame members that may be gripped by a user.

4. The rebound and balance training device of claim 3 wherein the handles are movable between and releasably securable at a plurality of vertical positions.

5. The rebound and balance training device of claim 1 wherein the resilient elements have a spring constant in a range between 0.25 and 2.50 and an undeflected length between 16 and 27 inches.

6. The rebound and balance training device of claim 1 wherein two foot support boards are arranged side-by-side and suspended above the floor by the resilient elements.

7. The rebound and balance training device of claim 1 wherein each array of openings of the foot support board lies below and is parallel to the array of openings of the suspending side frame member located above.

8. A rebound and balance training device supported on a floor operable in response to action of a user standing thereon comprising:
   a rigid frame having forward and rearward ends and having a pair of elevated horizontal side frame members supported above the floor by a pair of vertical frame members attached to forward ends of the side frame members,
      wherein the vertical frame members extend vertically above the horizontal side frame members, and
      wherein each vertical frame member comprises a grippable handle that is movable between, and releasably securable at, a plurality of vertical positions;
   a rigid foot support board having longitudinal forward and rearward edges, lateral side edges, a peripheral margin inwardly adjacent the edges, and a flat, upwardly facing surface in enclosing contact with the margin on which a user may stand;
   a plurality of elongate resilient elements of similar length extending between the side frame members and the foot support board and having connection hooks at each end; and
   a step structure attached to the frame at the rearward end of the rigid frame, opposite the vertical frame members, and having a top step, located vertically near the lower second height,
   wherein each of the side frame members has an array of at least three hook-connection openings in the peripheral margin along the lateral edges linearly aligned on a horizontal plane,
   wherein the foot support board, at the surface adjacent each side edge, has an array of at least three hook-connection openings linearly aligned,
   wherein the hooks at the ends of the resilient elements are releasably connectable to the side frame member openings and the foot support board openings, so that the foot support board is resiliently suspended below the side frame members and above the floor in a horizontal orientation at a first height when no user is standing on the foot support board and at a lower second height when a user is standing on the foot support board,
   wherein resilient elements may be added or removed to adjust overall spring force in accordance with a user's weight and the forces the user applies during exercise, and
   wherein the device is configured such that the user may stand on the foot support board and extend the resilient elements to effect reciprocal vertical motion of the foot support board by applying force on the foot support board.

* * * * *